US007593317B2

(12) United States Patent
Yuda et al.

(10) Patent No.: US 7,593,317 B2
(45) Date of Patent: Sep. 22, 2009

(54) RADIO BASE STATION APPARATUS

(75) Inventors: Yasuaki Yuda, Yokohama (JP); Takaaki Kishigami, Ota-ku (JP); Takashi Fukagawa, Kawasaki (JP); Keiji Takakusaki, Yokohama (JP); Shoji Miyamoto, Sendai (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 10/503,010

(22) PCT Filed: Aug. 1, 2003

(86) PCT No.: PCT/JP03/09793

§ 371 (c)(1),
(2), (4) Date: Jul. 29, 2004

(87) PCT Pub. No.: WO2004/013993

PCT Pub. Date: Feb. 12, 2004

(65) Prior Publication Data

US 2005/0018597 A1 Jan. 27, 2005

(30) Foreign Application Priority Data

Aug. 1, 2002 (JP) ............................. 2002-224571

(51) Int. Cl.
*H04J 11/00* (2006.01)
(52) U.S. Cl. ...................................................... 370/208
(58) Field of Classification Search ................ 370/208, 370/210, 328, 329, 343; 375/260–261, 267, 375/346–350, 358
See application file for complete search history.

(56) References Cited

U.S. PATENT DOCUMENTS

| 5,864,543 A | 1/1999 | Hoole |
| 6,249,250 B1 * | 6/2001 | Namekata et al. ............ 342/372 |
| 7,039,137 B1 * | 5/2006 | Lauterjung et al. .......... 375/349 |

(Continued)

FOREIGN PATENT DOCUMENTS

EP  1-085-678 A  3/2001

(Continued)

OTHER PUBLICATIONS

Jean-Rene Larocque, John Litva and Jim Reilly, "Calibration of a Smart Antenna for Carrying Out Vector Channel Sounding at 1.9 GHz," Wireless Personal Communications, Emerging Technologies for Enhanced Communications, 1999, front and inside pages, index page, preface (ix to xiii), pp. 259-268, Kluwer Academic Publishers, Norwell, Massachusetts.

(Continued)

*Primary Examiner*—Kwang B Yao
*Assistant Examiner*—Tung Q Tran
(74) *Attorney, Agent, or Firm*—RatnerPrestia

(57) ABSTRACT

A transmission weight computing section computes a transmission weight for directional transmission using an OFDM signal. A transmission correcting value memory section stores one correcting value for correcting the transmission weight for each sub-carrier of an OFDM signal or each band gathering a plurality of sub-carriers. A transmission weight correcting section corrects the transmission weight by the correcting value. A transmitting branch weights transmission data by a transmission weight outputted from the transmission weight correcting section on a sub-carrier-by-sub-carrier basis and delivers it to an antenna.

24 Claims, 10 Drawing Sheets

U.S. PATENT DOCUMENTS

| | | | |
|---|---|---|---|
| 7,113,548 B2* | 9/2006 | Tanaka et al. | 375/267 |
| 2002/0050948 A1* | 5/2002 | Tanaka et al. | 342/378 |
| 2002/0163977 A1* | 11/2002 | Kobayakawa | 375/296 |
| 2004/0228397 A1* | 11/2004 | Bach | 375/232 |
| 2006/0013327 A1* | 1/2006 | Sugar et al. | 375/260 |
| 2007/0015482 A1* | 1/2007 | Suominen | 455/313 |
| 2007/0253324 A1* | 11/2007 | Ma et al. | 370/208 |

FOREIGN PATENT DOCUMENTS

| | | |
|---|---|---|
| EP | 1-220-506 A | 7/2002 |
| JP | 10-336149 | 12/1998 |
| JP | 11-205026 A | 7/1999 |
| JP | 2002-208812 A | 7/2002 |

OTHER PUBLICATIONS

Boon Chong Ng, et al., "Sensor-Array Calibration Using a Maximum-Likelihood Approach," IEEE Transactions On Antennas and Propagation, IEEE, Inc., New York, US, Vol. 44, No. 6, Jun. 1, 1996, pp. 827-835.

Jean-Rene Larocque, John Litva and Jim Reilly, "Calibration of a Smart Antenna for Carrying Out Vector Channel Sounding At 1.9 GHz," pp. 259-268.

* cited by examiner

RADIO BASE STATION APPARATUS

This application as a U.S. National Phase Application of PCT International Application PCT/JP2003/009793.

TECHNICAL FIELD

This invention relates to a radio base-station apparatus of a radio communications system using an orthogonal frequency dividing multiplex (hereinafter referred to as "OFDM") scheme, and more particularly to a directional transceiver apparatus using an array antenna.

BACKGROUND ART

Conventionally, there is a communication scheme using OFDM broadly known as the radio base-station apparatus. Meanwhile, adaptive array antenna technology is now under study aiming at increasing the traffic capacity, broadening the communications area, suppressing the interference and the like. Attentions are drawn to the applications of the adaptive array antenna technology of the OFDM scheme. For example, there are those, including a description in JP-A-11-205026. This publication describes that a transmission/reception weight is computed on the basis of an interval of OFDM sub-carrier frequencies and an interval of array-antenna elements, so that weighting is carried out based on each sub-carrier thereby implementing directional transmission/reception.

In this conventional art, by setting transmission and reception weights for each sub-carrier, it is possible to eliminate the deviation of directional beam pattern that occurs at the interval of sub-carrier frequencies. However, where amplitude or phase deviation takes place at between transmitting/receiving branches, the formed beam pattern would deviate from the desired beam pattern. The radio-frequency circuit section, as a constituent element of each transmitting/receiving branch, is configured with many analog elements. These analog elements cause a characteristic deviation because of the difference between individual elements. Furthermore, the characteristic is varied by surrounding temperature, lapsing time and so on. By such analog element characteristic, amplitude/phase deviation is caused between the transmitting/receiving branches. Particularly, it is considered that, on a broadband signal such as an OFDM signal, a frequency characteristic is caused in the amplitude/phase deviation between the branches. Meanwhile, on the lines up to the antenna element, there occurs a difference in delay time between the transmitting branches because of the difference of line length to the antennas or line characteristic. From these factors, the amplitude/phase relationship set in transmission weight readily collapses between the antenna elements, making it impossible to obtain an ideal beam pattern. Meanwhile, there is a drawback that, in the case a broadband signal is sent, a different pattern of beam is possibly formed based on the frequency resulting from a deviated frequency characteristic.

DISCLOSURE OF THE INVENTION

It is an object of the present invention to provide a radio base-station apparatus which can form a desired directional beam pattern even in the case that an amplitude/phase deviation occurs between the branches of an array antenna, particularly when there is a frequency characteristic on the amplitude/phase deviation.

The radio base-station apparatus of the invention previously stores correcting values, based on each sub-carrier of OFDM signal, for correcting a characteristic of a radio circuit section in each transmitting/receiving branch of an array antenna. By correcting a computed transmission/reception weight with using a correcting value, a desired transmitting/receiving beam pattern is formed.

Meanwhile, the radio base station of the invention detects an amplitude/phase deviation between branches caused from a characteristic variation of the radio circuit sections in the respective transmitting/receiving branches of an array antenna, and stores a correcting value for correcting that deviation. Thereupon, detection is made based on each sub-carrier of OFDM signal, to compute a correcting value. Using the correcting value, the transmitting/receiving weight is corrected to weight the signal. Due to this, even where there is an amplitude/phase deviation between the branches, a desired beam pattern can be formed thereby enabling favorable communications.

A radio base-station apparatus of the invention comprises: a transmission weight computing section for computing a transmission weight for directional transmission using an OFDM signal; a transmission correcting value memory section for storing one correcting value for correcting the transmission weight for each sub-carrier of an OFDM signal or each band gathering a plurality of sub-carriers; a transmission weight correcting section for correcting the transmission weight by the correcting value; and a transmitting branch for weighting transmission data with a transmission weight outputted from the transmission weight correcting section on a sub-carrier-by-sub-carrier basis and deliver it to an antenna element. Due to this, when directionally transmitting an OFDM signal, the transmitting weight can be corrected by a correcting value, to form a transmission beam.

Meanwhile, a radio base-station apparatus of the invention comprises a plurality of the transmitting branches and an array antenna structured by a plurality of the antenna elements. Due to this, when directionally transmitting an OFDM signal by using an array antenna, the transmitting weight can be corrected by a correcting value, to form a transmission beam.

Meanwhile, the transmitting branch of a radio base-station apparatus of the invention comprises a weight operating section for weighting the transmission data with a transmission weight outputted from the transmission weight correcting section, an inverse fast Fourier transform operating section for carrying out inverse Fourier transformation on an output signal of the weight operating section, a D/A converting section for converting an output signal of the inverse fast Fourier operating section into an analog signal, and a transmitting-system radio circuit section for frequency-converting an output signal of the D/A converting section into a radio frequency. Due to this, an OFDM signal with a transmitting weight can be fed to the antenna element.

Meanwhile, the transmission weight correcting section of a radio base-station apparatus of the invention corrects, based on each sub-carrier or based on each band gathering together a plurality of sub-carriers, an OFDM-signal-sub-carrier based transmission weight computed in the transmission weight computing section, by using a correcting value stored in the transmission correcting value memory section. Due to this, a desired beam pattern can be formed more accurately within a bandwidth of OFDM signal.

Meanwhile, the transmission weight computing section of a radio base-station apparatus of the invention divides an OFDM signal bandwidth into a plurality and computes one transmission weight for a plurality of sub-carriers existing in a divisional band, the transmission weight correcting section correcting, based on each sub-carrier or based on each band gathering together a plurality of sub-carriers, a transmission weight computed in the transmission weight computing section by using a correcting value stored in the transmission correcting value memory section. Due to this, a desired beam pattern can be formed more accurately within a bandwidth of OFDM signal while reducing the number of times of transmitting weight computations.

Meanwhile, the correcting value stored by the transmission correcting value memory section of a radio base-station apparatus of the invention is to correct an amplitude deviation and phase deviation to occur between the transmission branches. Due to this, the storage capacity of the transmission correcting memory section can be efficiently reduced.

Meanwhile, the weight operating section of a radio base-station apparatus of the invention weights transmission data on a sub-carrier-by-sub-carrier basis, with a transmission weight of each sub-carrier corrected by the transmission weight correcting section. Due to this, a desired beam pattern can be formed more correctly because weighting is possible based on each sub-carrier of OFDM signal.

Meanwhile, a radio base-station apparatus of the invention further comprises a correcting branch radio circuit section for inputting a signal outputted from the transmitting branch and carrying out at least frequency conversion, an A/D converting section for converting an output signal of the correcting branch radio circuit section into a digital signal, a fast Fourier transform operating section for Fourier-transforming an output digital signal of the A/D converting section, and a frequency-response correcting value detecting section for taking as a reference an output signal of the weight operating section, to detect an amplitude deviation and phase deviation of a signal of from the fast Fourier operating section and detect a correcting value for correcting an amplitude deviation and phase deviation between the transmitting branches, the antenna element being removable. Due to this, the antenna element can be easily removed, to use the correcting branch for detecting an amplitude and phase deviation between the transmitting branches and computing and storing a correcting value.

Meanwhile, the transmission correcting value memory section of a radio base-station apparatus of the invention is stored with a correcting value computed by the frequency-response correcting value detecting section when the correcting branch radio circuit section is connected, one to one, with the transmitting branch in a state the antenna element is not connected. Due to this, in the transmission correcting value memory section, actually measured correct one can be stored as a correcting value to an amplitude and phase deviation between transmitting branches.

Meanwhile, a radio base-station apparatus of the invention further comprises power distributing section arranged close to the antenna element, a correcting branch radio circuit section for inputting a signal distributed in the power distributing section and carrying out at least frequency conversion, an A/D converting section for converting an output signal of the plurality of correcting branch radio circuit sections into a digital signal, a fast Fourier transform operating section for Fourier-transforming an output digital signal of the A/D converter section, and a frequency-response correction detecting section for taking as a reference an output signal of the weight operating section, to detect an amplitude deviation and phase deviation of a signal of from the fast Fourier transform operating section and detect a correcting value for correcting an amplitude deviation and phase deviation between the transmitting branches, the transmission correcting value memory section being stored with a correcting value detected by the frequency-response correction detecting section. Due to this, it is possible to detect a correcting value for correcting an amplitude and phase deviation between transmitting branches, at any time during transmission.

Meanwhile, the frequency-response correction detecting section of a radio base-station apparatus of the invention detects an amplitude and phase of an output signal of the fast Fourier transform operating section based on each sub-carrier of OFDM signal, and detects a correcting value for correcting an amplitude deviation and phase deviation between transmitting branches on a sub-carrier-by-sub-carrier basis by using a detection result of the amplitude and phase. Due to this, it is possible to obtain a correction value for forming more correctly a desired beam pattern within an OFDM signal bandwidth.

Meanwhile, a radio base-station apparatus of the invention further comprises a first switch for selecting one from signals distributed by a plurality of power distributing section and connecting it with the correcting branch radio circuit section, and a second switch for selecting a signal from a plurality of weight operating sections and connecting it with the frequency-response correcting value detecting section, the first switch and the second switch selecting the signal from the same transmitting branch. Due to this, even in case the correcting branch is one in the number, switching the both switches enables to determine a correcting value to an amplitude and phase deviation on all the transmitting branches.

Meanwhile, a radio base-station apparatus of the invention further comprises a transmission correcting matrix memory section previously storing a correcting matrix for correcting a coupling between antenna elements, the transmission weight correcting section further correcting the transmission weight by the correcting matrix. Due to this, the coupling between antenna elements can be corrected in addition to the correction to an amplitude and phase deviation between transmitting branches.

Meanwhile, the transmission correcting matrix memory section of the radio base-station apparatus of the invention is stored with correcting matrixes based on each sub-carrier of OFDM signal. Due to this, it is possible to correct a coupling between antenna elements based on each sub-carrier of OFDM signal.

Meanwhile, the transmission correcting matrix memory section of a radio base-station apparatus of the invention is stored with correcting matrixes based on a plurality of sub-carrier existing in plurally divided signal bands of OFDM signal. Due to this, the storage capacity of the transmitting correcting matrix memory section can be reduced by correcting a coupling between antenna elements based on each divisional band in an OFDM signal bandwidth.

Meanwhile, a radio base-station apparatus of the invention comprises: a reception weight computing section for computing a reception weight by using a plurality of demodulated signal that an OFDM signal received at an array antenna is demodulated; a reception correcting value memory section for storing one correcting value for correcting the reception weight for each sub-carrier of an OFDM signal or each band gathering a plurality of sub-carriers; a reception weight correcting section for correcting the reception weight by the correcting value; and a weight operating section for weighting the demodulated signal with the corrected reception weight. Due to this, in the case of directionally receiving an OFDM signal by using an array antenna, a reception beam can be formed by correcting a reception weight with a correcting value.

Meanwhile, the reception weight correcting section of a radio base-station apparatus of the invention corrects, based on each sub-carrier or based on each band gathering together a plurality of sub-carriers, an OFDM-signal-sub-carrier based reception weight computed in the reception weight computing section, by using a correcting value stored in the reception correcting value memory section. Due to this, in the case of directionally receiving an OFDM signal by using an array antenna, a reception beam can be correctly formed by a correction on a sub-carrier-by-sub-carrier basis.

Meanwhile, the reception weight computing section of a radio base-station apparatus of the invention divides an OFDM signal bandwidth into a plurality and computes one reception weight for a plurality of sub-carriers existing in a divisional band, the reception weight correcting section correcting, based on each sub-carrier or based on each band gathering together a plurality of sub-carriers, a reception weight computed in the reception weight computing section by using a correcting value stored in the reception correcting value memory section. Due to this, in the case of directionally receiving an OFDM signal by using an array antenna, a reception beam can be nearly correctly formed while reducing the number of times of reception weight computations.

Next, the correcting value stored in the reception correcting value memory section of a radio base-station apparatus of the invention is to correct an amplitude deviation and phase deviation to occur between the receiving branches. Due to this, in the case of directionally receiving an OFDM signal by using an array antenna, it is possible to store a sub-carrier-based correcting value for forming a reception beam more correctly.

Meanwhile, the weight operating section of a radio base-station apparatus of the invention weights the demodulated signal, based on each sub-carrier, by a reception weight of each sub-carrier corrected by the reception weight correcting section. Due to this, in the case of directionally receiving an OFDM signal by using an array antenna, a reception beam can be formed more correctly by the weighting corrected based on each sub-carrier.

Meanwhile, a radio base-station apparatus of the invention comprises: a reference signal generating section for generating a signal as a reference to detect an amplitude deviation and phase deviation between receiving branches; an inverse fast Fourier transform operating section for Fourier-transforming a signal of from the reference signal generating section; a D/A converting section for converting an output signal of the inverse fast Fourier operating section into an analog signal; a correcting branch radio circuit section for frequency-converting the output analog signal of the D/A converting section into a radio frequency; and a frequency-response correcting value detecting section for taking as a reference an output signal of the reference signal generating section, to detect an amplitude deviation and phase deviation of an output signal of from the fast Fourier operating section and detect a correcting value for correcting an amplitude deviation and phase deviation between the receiving branches, the array antenna being removable. Due to this, a correcting branch can be used in detecting an amplitude and phase deviation between receiving branches and in computing and storing a correcting value.

Meanwhile, the reception correcting value memory section of a radio base-station apparatus of the invention stores a correcting value computed by the frequency-response correcting value detecting section when the correcting branch radio circuit section is connected, one to one, with the receiving branch in a state the antenna element is not connected. Due to this, in the reception correcting value memory section, actually measured correct one can be stored as a correcting value to an amplitude and phase deviation between receiving branches.

Meanwhile, a radio base-station apparatus of the invention comprises: a receiving circuit section having a receiving weight computing section for computing a reception weight by using a plurality of demodulated signals that an OFDM signal received at an antenna element configuring an array antenna is demodulated; a reception correcting value memory section storing a correction value for correcting the reception weight based on each sub-carrier of OFDM signal or based on band gathering together a plurality of sub-carriers; a reception weight correcting section for correcting the reception weight by the correcting value; and a weight operating section for weighting the demodulated signal by the corrected reception weight; a transmitting circuit section having a transmission weight computing section for computing a transmission weight for directional transmission by using information about a directivity in the reception weight computing section; a transmission correcting value memory section for storing a correction value for correcting the transmission weight based on each sub-carrier of OFDM signal or based on band gathering together a plurality of sub-carriers; a transmission weight correcting section for correcting the transmission weight by the correcting value; and a transmitting branch for weighting transmission data by a transmission weight outputted from the transmission weight correcting section on a sub-carrier-by-sub-carrier basis and delivering it to the antenna element; and a switch section for switching over a connection between the antenna element and the receiving circuit section or a connection between the antenna element and the transmitting circuit section. Due to this, in the case of directionally transmitting and receiving an OFDM signal by using an array antenna, the transmission and reception weight can be corrected by a correcting value, to form a transmission and reception beam.

As in the above, according to the present invention, in the transmitter apparatus for directionally transmitting an OFDM signal by using an array antenna, a correction value detected on a sub-carrier-by-sub-carrier basis is held for an amplitude/phase deviation to occur between the transmitting branches, enabling to correct the transmission weight on a sub-carrier-by-sub-carrier basis. Due to this, it is possible to put, near a desired beam pattern, a deviation of beam pattern occurring due to an amplitude/phase deviation between the transmitting branches and a frequency characteristic of the deviation. Furthermore, by detecting a correcting matrix for correcting a coupling between antenna elements on a sub-carrier-by-sub-carrier basis, it is possible to correct a coupling between antenna elements on the basis of each carrier within a signal bandwidth. From these, a desired beam pattern can be obtained even on a broadband signal, obtaining favorable communications.

BEST MODE FOR CARRYING OUT THE INVENTION

Now, embodiments of the present invention are explained by using the drawings.

Embodiment 1

Figure 1:
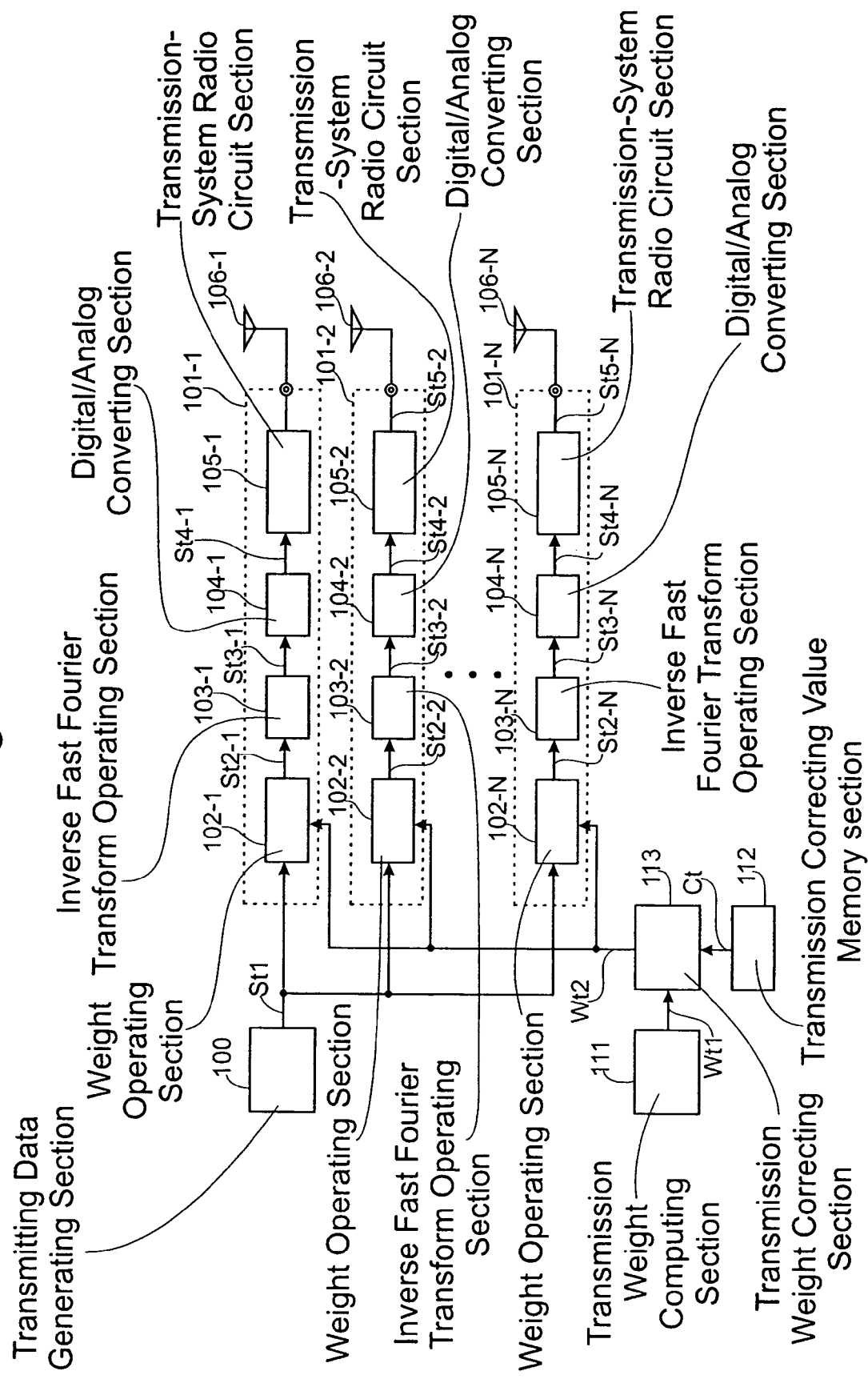
FIG. 1 is a block connection diagram of a radio base-station apparatus according to embodiment 1 of the invention.

FIG. 1 is a block connection diagram of a radio base station apparatus according to a first embodiment of the present invention. The radio base station apparatus is an apparatus to send a signal of an OFDM modulation scheme, and has an array antenna made up by a plurality of antenna elements. A weight operating section 102 controls the amplitude and phase of a signal radiated at antenna elements, thereby enabling directional sending of signals.

In FIG. 1, a transmission branch 101-1, 101-2, . . . 101-N is configured with a weight operating section 102-1, 102-2, . . . 102-N, an inverse fast Fourier transform (IFFT) operating section 103-1, 103-2, . . . 103-N, a digital/analog (D/A) converting section 104-1, 104-2, . . . 104-N, and a transmission-system radio circuit section 105-1, 105-2, . . . 105-N. Herein, provided that the number of antenna elements is N, the transmission branch are N systems in the number.

The array antenna is made up by a plurality of antenna elements 106-1, 106-2, . . . 106-N. These antenna elements are removably arranged.

A transmitting-data generating section 100 generates information to be sent, and outputs a transmitting-data string St1. Generally, the transmitting-data string St1 is in a radio access channel configuration processed by coding, multiplexing or the like. For example, the Frequency Division Multiple Access scheme (FDMA) is to implement multiplex within a frequency domain, the Time Division Multiple Access scheme (TDMA) is to carry out multiplex within the time domain, and the Code Division Multiple Access scheme (CDMA) is to perform code multiplex. Herein, there is no need to especially limit the transmitting-data generating section 100 and transmitting-data string St1 to such a signal format. For example, the transmitting-data string St1 may be a complex-numbered data string, comprising a common-mode component (I channel) and an orthogonal component (Q channel).

A transmission-weight computing section 111 computes a transmission-weight Wt1 to control the amplitude and phase of a transmitting signal for radiation through the antenna elements. Generally, the transmission weight is complex-number data capable of representing an amplitude and phase. Although there are some techniques as methods to compute a transmission weight Wt1, the transmission-weight computing section 111 does not require for the technique to be limited especially. Herein, as one example of a method to compute a transmission weight, there is a method of estimating a direction of mobile station on the basis of a signal from a mobile station received in a base station.

The transmission-weight computing section 111 computes a transmission weight such that a beam pattern has a directivity directed toward the direction to mobile station thus obtained.

Figure 2:
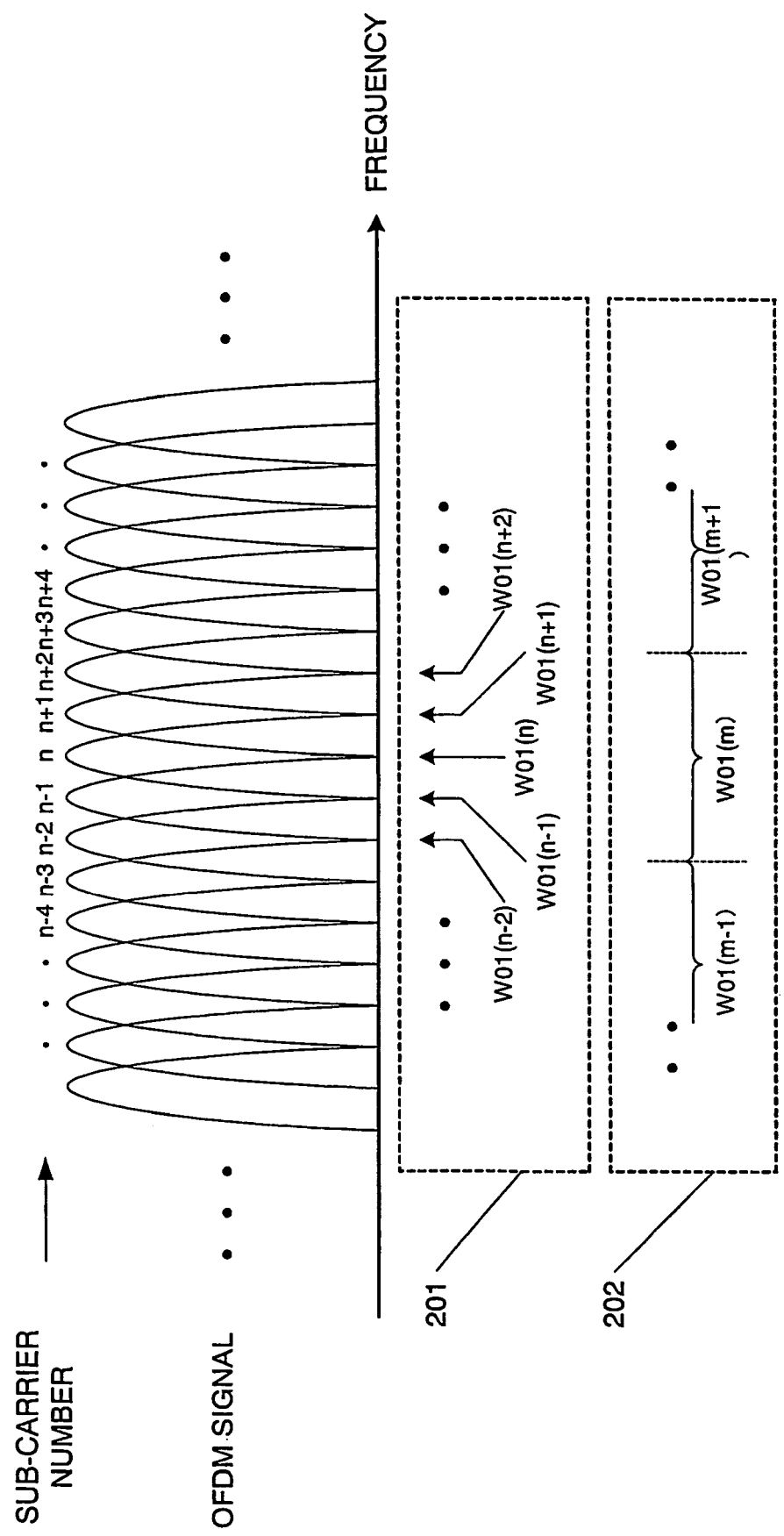
FIG. 2 is a concept view of assigning a reception weight for an OFDM signal in embodiment 1.

Herein, because the transmitting signal is an OFDM signal, its sub-carriers can be set by transmission weights. As shown in FIG. 2, where taking a transmitting method to set a transmission weight on a sub-carrier-by-sub-carrier basis, an optimal transmission weight can be set for each sub-carrier by computing a transmission weight independently of each sub-carrier. In FIG. 2, n represents a sub-carrier number. In computing a transmission weight in this case, there is a need for frequency of each sub-carrier and an interval of the array antenna therefor. In case the number of all the sub-carriers of OFDM signal is assumed F, F times computation processes are required in computing all the transmission weights based on each sub-carrier requires (201).

Meanwhile, as shown in FIG. 2, the OFDM signal domain can be divided into a plurality of bands so that the sub-carriers existing in the band are set, as one group, with the same transmission weight (202). In this case, m represents the number of divisional bands. The frequency required in computing a transmission weight desirably uses a center frequency of a band as a subject-of-computation. In the case the OFDM signal band is divided into M, M times of computation processes are required to compute all the transmission weights. However, operation amount can be reduced as compared with the case of setting a transmission weight for each sub-carrier. This is effective particularly in such broadband communications as to use the band up to 100 MHz. Meanwhile, in the case of dividing the OFDM signal band, division may be at an equal interval or at an unequal interval. This is because, where the frequency characteristic of amplitude/phase deviation is not even over the entire band, band division is preferably made with deviations in an equal degree. In the case that amplitude/phase deviation occurs greatly at or around the band both ends relative to the deviation at the band center, band division is especially fine at or around the band both ends. Furthermore, sole one transmission weight can be set to all the sub-carriers. In this case, the process is only once in computing transmission weights. The transmission weight Wt1 thus computed is outputted.

A transmission correcting-value memory section 112 stores a correcting value Ct for correcting an amplitude deviation and phase deviation to occur between the transmitting branches 101. In the case the transmitting signal has a broad signal band, the amplitude deviation and phase deviation occurred at between the transmitting branches 101 has a frequency characteristic. With the OFDM signal, such a frequency characteristic in amplitude and phase deviation can be corrected on a sub-carrier-by-sub-carrier basis. Consequently, the transmission correcting-value memory section 112 is previously stored with sub-carrier-based correcting values for the transmitting branches. Namely, provided that the number of transmitting branches is N and the number of all the sub-carriers is F, correcting values in the number of (N×F) are stored.

Meanwhile, the transmission correcting-value memory section 112 can divide a signal band into a plurality similarly to the transmission weight computing section 111, to store correcting values Ct in the number of divisional bands. Also, only one correcting value Ct can be stored for the entire signal band.

Explained later is a method to determine a correcting value C for correcting the amplitude and phase deviation between the transmitting branches 101. Herein, there is, as a data form of correcting value Ct, complex-number data for representing an amplitude and phase.

A transmission weight correcting section 113 makes a correction on the transmission weight Wt1 computed in the transmission weight computing section 111 by a correcting value Ct stored in the transmission correcting-value memory section 112. Where the transmission weight Wt1 and the correcting value Ct are both complex-number data, correction is possible by means of a complex multiplication of transmission weight Wt1 and correcting value Ct. Herein, shown in the following, as one example, is a corrected transmission weight Wt2 to be outputted from the transmission weight correcting section 113 in the case that the transmission weight Wt1 is computed based on each sub-carrier and similarly the correcting value Ct is stored based on each sub-carrier.

$$Wt2\text{-}n(f) = Wt1\text{-}n(f) \cdot Ct\text{-}n(f) \text{ where } n=1, \ldots, N; f=1, \ldots, F$$

Herein, N is the number of array antenna elements while F represents the number of sub-carriers in the OFDM signal.

Now, explained is the operation in the transmitting branch 101. Herein, the transmission branches have the same function as to the weight operating section 102, IFFT operating section 103, D/A converting section 104 and transmission-system radio circuit section 105 configuring the transmitting branch. Accordingly, the operation is explained representatively on the N-th transmitting branch.

Figure 3:
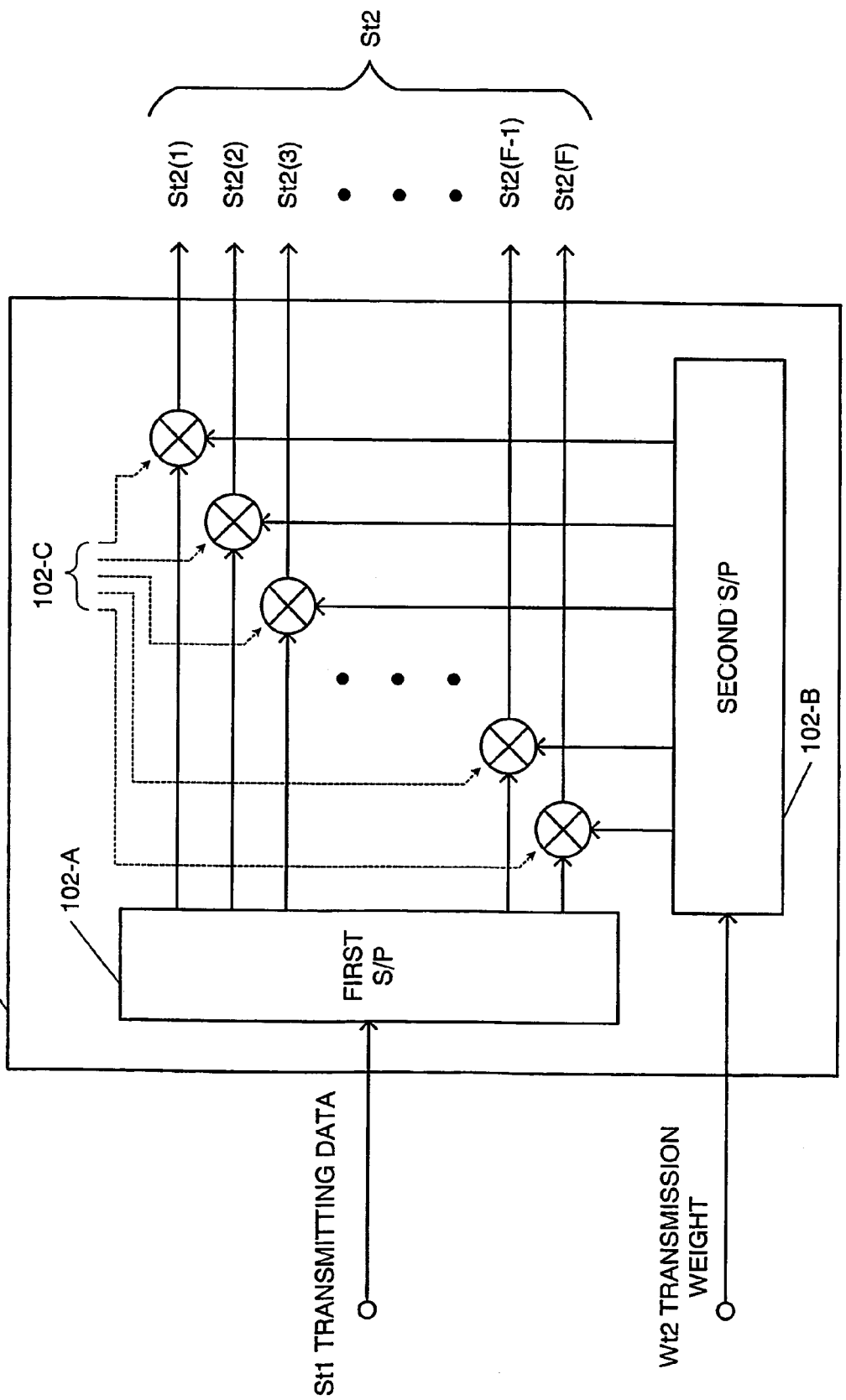
FIG. 3 is an operation concept diagram of a weight operating section in embodiment 1.

In the outset, the transmitting data St1 outputted from the transmitting data generating section 100, in the weight operating section 102-N, is weighted based on a transmission weight Wt outputted from the transmission weight correcting section 113. When the transmitting data St1 and the transmission weight Wt2 are respectively complex-number data, weight operation is possible by complex multiplication. Herein, using FIG. 3, outlined is an operation of the weight operating section 102 in the case transmission weights Wt2 are set based on each sub-carrier of OFDM signal. FIG. 3 is an operation concept view of the weight operating section. In FIG. 3, transmitting data St1 is chronological data. In the case of setting a transmission weight based on each sub-carrier of OFDM signal, the transmitting data St1 is transformed based on each sub-carrier and multiplied by transmission weights based on each sub-carrier, thereby enabling weighting. In order to realize this, a first series/parallel (S/P) transforming section 102-A transforms time-series transmitting data St1 into the corresponding parallel transmitting data on the sub-carrier-by-sub-carrier basis. A second series/parallel (S/P) transforming section 102-B transforms a time-series transmission weight Wt2 into sub-carrier-based parallel transmitting data. Multipliers 102-C multiply the parallel transmitting data St1 by a transmission weight Wt2, on a sub-carrier-by-sib-carrier basis. Each multiplier has output data S2 that can be expressed as follows:

$$St2(f) = St1(f) \cdot Wt2(f) \text{ where } f=1, \ldots, F$$

Herein, f represents a sub-carrier number. Meanwhile, because transmitting data St1 and transmission weight Wt2 are generally complex-number data, complex multiplication is carried out in the multiplier 102-C. Accordingly, the weight operating section 102 outputs a sub-carrier-based output signal St2. Incidentally, although the FIG. 3 example is configured to transform the input transmitting data St1 into parallel data based on the sub-carrier basis, this is not particularly limited to. Realization is possible in case the configuration is for a convoluting operation capable of weighting with a sub-carrier-based transmission weight while keeping the transmitting data St1 as chronological data.

Then, the output data St2 of the weight operating section 102 is inversely Fourier-transformed by the IFFT operating section 103. Herein, although there is available discrete Fourier transformation as a computation method for inverse Fourier transformation, inverse fast Fourier transform (IFFT) is desirable in terms of computation time and operation processing amount. Herein, omitted is the detailed explanation concerning IFFT. Meanwhile, as shown in FIG. 3, in the case that the output data St2 of the weight operating section 102 is sub-carrier-based parallel data, the IFFT operating section 103 carries out inverse Fourier operation on the parallel data as it is. Otherwise, in the case that the output data St2 is chronological data, series/parallel (S/P) transform is once made to have parallel data on which inverse Fourier transformation is carried out. As a result of inverse Fourier transformation, time-waveform transmitting data St3 is outputted. Time-waveform transmitting data St3 can be expressed as follows:

$$St3(t) = F^{-1}\{St2(f)\} \text{ where } St3(f) = St2(f) \quad (1)$$

Herein, $F^{-1}$ represents inverse Fourier transformation. From then on, the transmitting signal is in a time-waveform but shown by a frequency waveform. In the D/A converting section 104, the output time-waveform transmitting data St3 from the IFFT operating section 103 is transformed from a digital signal into an analog signal. The output signal St4 of the D/A converting section 104 is an analog time-waveform transmitting signal.

Then, the analog time-waveform transmitting signal St4, as an output of the D/A converting section 104, is frequency-converted from a base-band frequency into a radio frequency in the transmitting-system radio circuit section 105. Thereafter, transmitting-signal process is carried out in the radio frequency band, e.g. power amplification, in order for radiation through the antenna element. Incidentally, besides this, a filter process and the like are included in the transmitting-signal process. Thus, a radio transmitting signal St5, as an output signal of the transmitting-system radio circuit section 105, is radiated through the antenna terminal 106.

Now, explanation is made on a method for determining a correcting value Ct, referred before. The correcting value Ct is to detect a frequency characteristic of amplitude/phase deviation in the transmitting-signal circuit section 105 and to correct a deviation thereof. Consequently, computing a correcting value Ct is satisfactorily to detect a frequency characteristic of amplitude/phase deviation in the transmitting-signal circuit section 105. For example, there is the following method, which is explained in the below by using FIG. 4.

Figure 4:
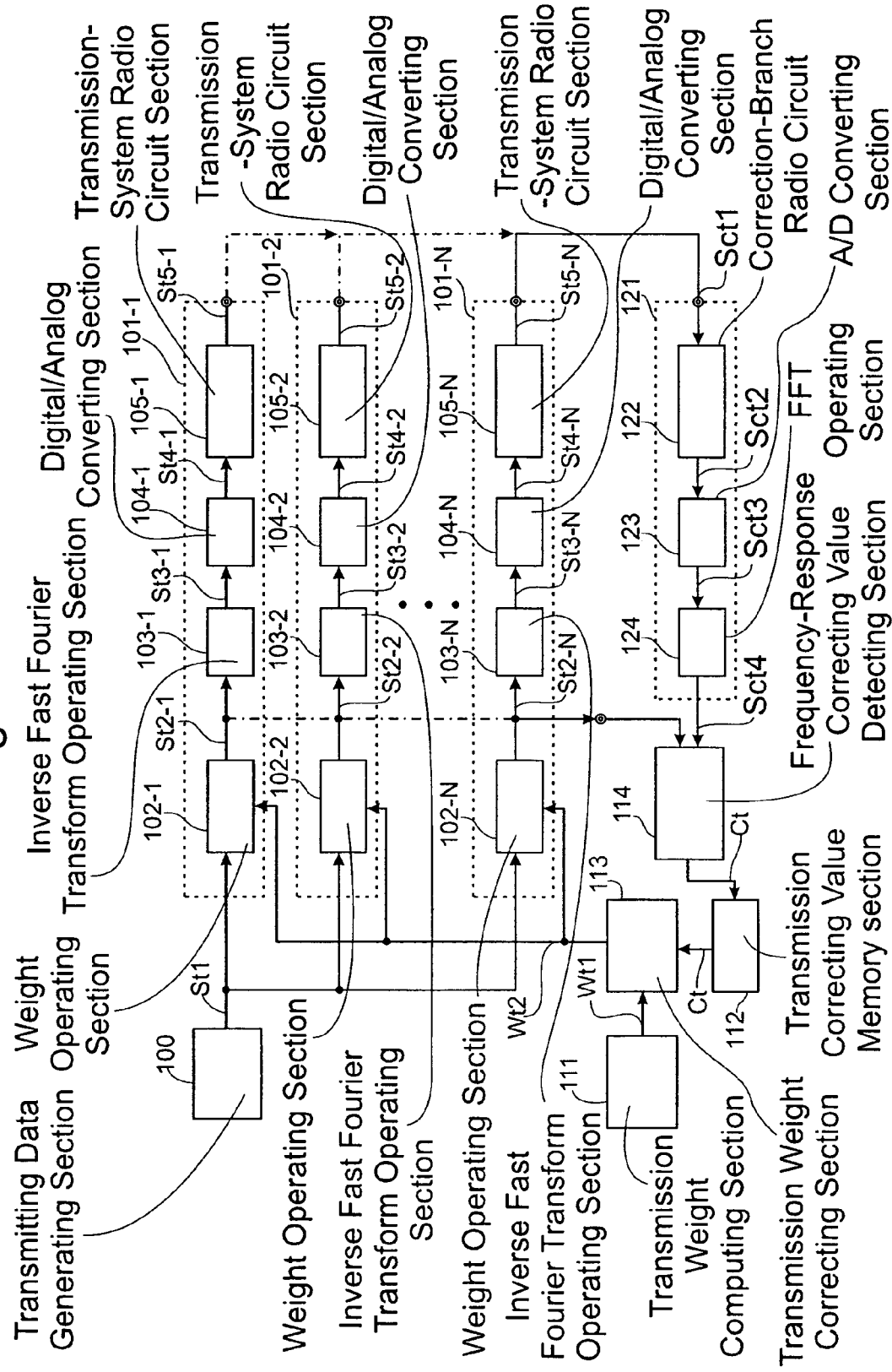
FIG. 4 is a block connection diagram exemplifying a correcting-value detecting method in embodiment 1.

FIG. 4 is the radio base-station apparatus of this embodiment with the removal antenna elements removed and with a correcting branch for computing a correcting value connected. In FIG. 4, a correcting branch 121 is configured with a correction-branch radio circuit section 122, an A/D converting section 123, and an FFT operating section 124. Herein, the correction-branch radio circuit section 122 is to frequency-convert a radio frequency signal into a base-band frequency or intermediate frequency. Besides these, processes such as filtering are included. Meanwhile, because of a configuration with many analog circuits similarly to the transmitting-system radio circuit section 105, a frequency characteristic takes place due to the analog-element characteristic. This frequency characteristic is expressed as follows:

$$Zc(f)$$

A frequency-response correcting value detecting section 114 is to detect a frequency characteristic of amplitude and phase deviation on a signal Sct4 of from the correcting branch 121, on the basis of an output signal St2 of the weight operating section 102 in the transmitting branch 101. The other configuration blocks are the same as those described in FIG. 1, having the same function.

Herein, explanation is made on a method of detecting a correcting value related to the N-th transmitting branch. As for the other transmitting branches, a correction can be similarly detected by changing the connection of the transmitting branch 101 and correcting branch 121 and the connection of the weight operating section 102 and frequency-response correcting value detecting section 114.

At first, the antenna element is removed, to connect the transmitting-system radio circuit section 105-N to an input of the correcting branch 121. Herein, the frequency characteristic of amplitude and phase variation in the transmitting-system radio circuit section 105 is assumably expressed as follows:

$$Z(f) \quad (2)$$

Using Equations (1) and (2), the transmitting signal St5 as an output of the transmitting-system radio circuit section 105 is changed as follows:

$$St5(f) = St2(f) \cdot Z(f)$$
$$= St1(f) \cdot Wt1(f) \cdot C(f) \cdot Z(f)$$

For example, the transmitting signal St5-N in the n-t branch in the state there is no correcting value, i.e. in the case of Ct=1, is as follows:

$$St5\text{-}N(f) = St1(f) \cdot Wt1\text{-}N(f) \cdot Z\text{-}N(f) \quad (3)$$

Due to this, the input signal Sct1 to the correcting branch 121 is a transmitting signal St5-N of the N-th transmitting branch. Accordingly, as shown in Equation (3), in the state there is no correcting value, i.e. in the case of C=1, we have the following:

$$Sct1(f) = St5\text{-}N(f) = St1(f) \cdot Wt1\text{-}N(f) \cdot Z\text{-}N(f)$$

The input signal Sct1 is a radio frequency signal, which is to be frequency-transformed in a correcting-branch radio circuit section 122. However, because of a frequency characteristic Zc(f) caused by the correcting-branch radio circuit section 122, the output signal Sct2 is given in the following equation.

$$Sct2(f) = Sct1(f) \cdot Zc(f) = St1(f) \cdot Wt1\text{-}N(f) \cdot Z\text{-}N(f) \cdot Zc(f)$$

Then, the output signal Sct, in the A/D converting section 123, is converted into a digital signal Sct3. Herein, the clock for use in the A/D converting section 123 uses the same one as the D/A converting section 104 whereby the A/D converting section 123 can output a digital signal Sct3 same in sampling rate as and synchronous with that of the D/A converting section 104.

Next, the FFT operating section 124 Fourier-transforms the digital signal Sct3 outputted from the A/D converting section 123, to output frequency waveform data Sct4. The frequency waveform data Sct4 is inputted to the frequency-response correcting value detecting section 114.

On the other hand, the output signal St2-N of the weight operating section 102-N is inputted to the frequency-response correcting value detecting section 114, similarly to the frequency waveform data Sct4.

Then, in the frequency-response correcting value detecting section 114, detected is a frequency characteristic of amplitude and phase deviation of the signal Sct2 from the correcting branch 121 on the basis of the output signal St2 of the weight operating section in the transmitting branch 102.

Herein, provided that the frequency characteristic of amplitude and phase deviation is h, there is, for example, the following method as a detecting method:

$$hN(f) = Sct4(f) \cdot (St2 - N(f))^*$$
$$= St2 - N(f) \cdot Z - N(f) \cdot Zc(f) \cdot (St2 - N(f))^*$$
$$= |St2 - N(f)|^2 \cdot Z - N(f) \cdot Zc(f)$$
$$= Z - N(f) \cdot Zc(f)$$

From the frequency characteristic h of amplitude and phase deviation thus determined, the correcting value Ct can be determined as follows:

$$Ct - N(f) = \frac{1}{hN(f)}$$
$$= \frac{1}{Z - N(f) \cdot Zc(f)}$$

In this manner, it is possible to detect a correcting value Ct-N for correcting the frequency characteristic of amplitude and phase deviation of the transmitting-system radio circuit section 105-N, in respect of the N-th transmitting branch 101-N.

The detected correcting value Ct-N is inputted to and stored in the transmission correcting-value memory section 112, whereby it can be used in correcting a transmission weight. Furthermore, by carrying out the correcting-value detecting operation for all the transmitting branches, the transmission correcting-value memory section 112 is allowed to store the correcting values of all the branches and all the sub-carriers.

Incidentally, the correcting value Ct stored in the transmission correcting-value memory section 112 includes a frequency characteristic Zc of the correction-branch radio circuit section 122 of the correcting branch 121. Because of common between all the branches, the relative relationship is kept between the branches in each sub-carrier. Accordingly, this does not have an effect upon the transmission weight. However, by separately making a measurement as to only the correcting branch 121 and detecting a frequency characteristic Zc of the correcting branch radio circuit 122, the frequency characteristic Zc can be removed from the correcting value Ct.

As described above, according to the present embodiment, where directionally sending a broadband OFDM signal, by correcting a frequency characteristic of amplitude and phase deviation to occur between the transmitting branches on each sub-carrier, a desired beam pattern can be formed within an OFDM-signal bandwidth. This realizes efficient transmission.

Incidentally, in the case that the radio base-station apparatus of this embodiment is used in FDMA, the transmitting data generating section 100 generates such a signal as to be frequency-multiplexed in order to assign a plurality of sub-carriers to the respective users. Meanwhile, the transmission weight computing section 111 generates a transmission weight for each sub-carrier assigned to the user, correspondingly to the data generated in the transmitting data generating section 100.

Incidentally, where the radio base-station apparatus of this embodiment is used in TDMA, the transmitting data generating section 100 generates a signal time-multiplexed such that time is assigned based on each user. Meanwhile, the transmission weight computing section 111 makes a processing for each transmit weight correcting section 113 while the weight operating section 102 carries out processing based on each user divisional in time.

Incidentally, where the radio base-station apparatus of this embodiment is used in CDMA, transmitting data is generated for each user, to compute a transmission weight for each user. After carrying out weighting for each user, code-multiplex is implemented.

Embodiment 2

Figure 5:
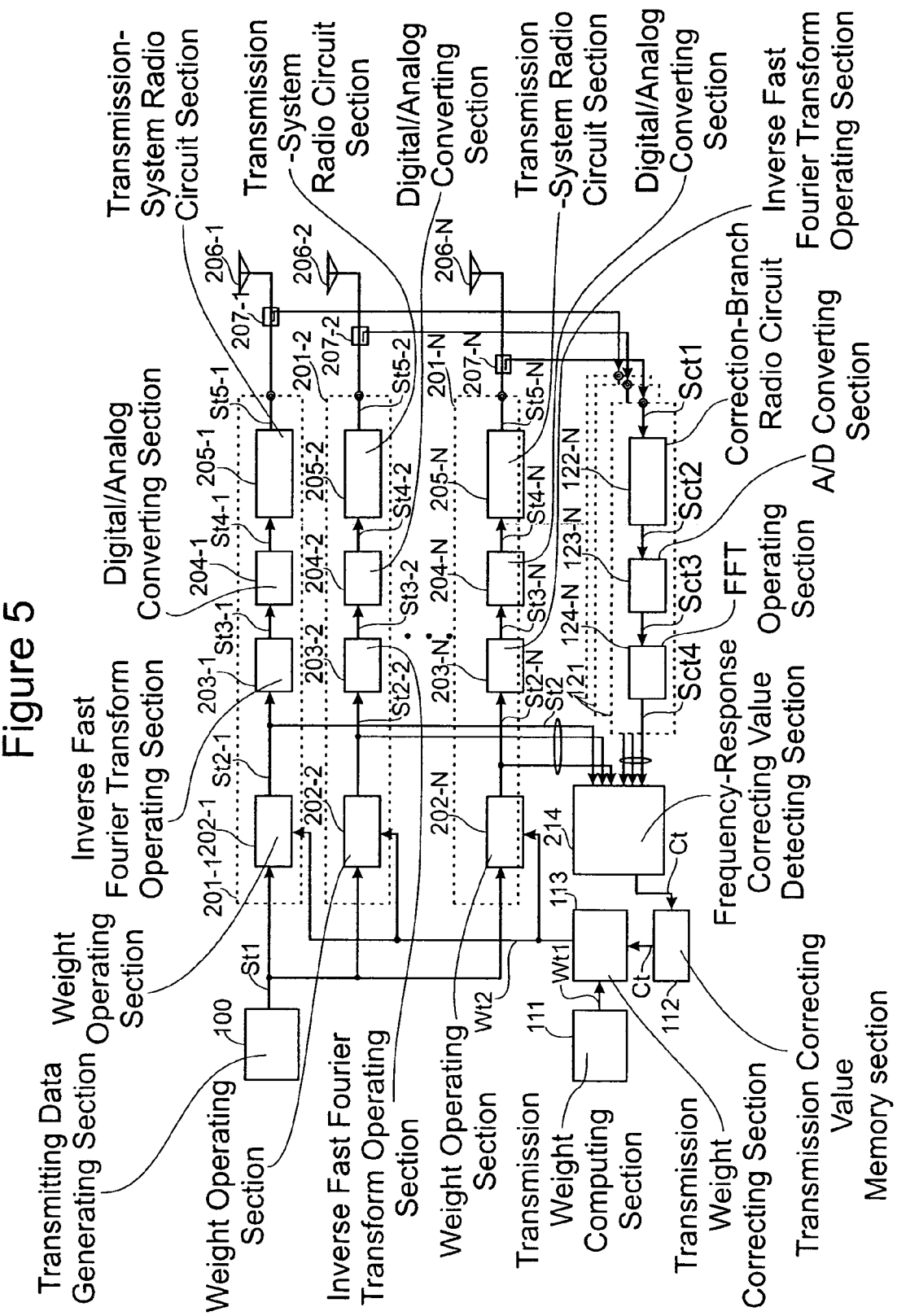
FIG. 5 is a block connection diagram of a radio base-station apparatus according to embodiment 2.

FIG. 5 is a block connection diagram of a radio base-station apparatus according to a second embodiment of the invention. In FIG. 5, power distributing section 207-1, 207-2, 207-N are respectively arranged close to antenna elements 206-1, 206-2, 206-N, to distribute the power of the transmitting signal St5-1, St5-2, St5-3 outputted from the transmitting branch 201-1, 201-2, 201-N and output it to the correcting branch 121-1, 121-2, 121-N. In this case, power distribution is slight in such a degree as not to have an effect upon the power to be fed to the antenna element 206-1, 206-2, 206-N.

The correcting branches 121-1, 121-2, 121-N are respectively connected to the transmitting branches 201-1, 201-2, 201-N through power distributing section 207-1, 207-2, 207-N. These are to feed back a part of the output from the transmitting branch, in order to compute a correcting value. The correcting branches have the same configuration and function as that of the correcting branch 121 of FIG. 4 of embodiment 1.

A frequency-response correcting value detecting section 214 detects a frequency characteristic of amplitude and phase deviation of the frequency waveform data Sct4-N of from the correcting branch, on the basis of an output signal St2-1, St2-2, St2-N of the weight operating section 202-1, 202-2, 202-N, thereby detecting a correcting value Ct-1, Ct-2, Ct-N to the transmitting-system radio circuit section 205-1, 205-2, 205-N. In this case, the frequency-response correcting value detecting section 214 previously measures and stores a characteristic of the correcting branch radio circuit section 122-1, 122-2, 122-N of the correcting branch 121-1, 121-2, 121-N. By using the stored characteristic, the amplitude and phase deviation occurred in the correcting branch radio circuit section is further corrected, thereby detecting only an amplitude and phase deviation to be caused by the transmitting branch.

The other configuration blocks and transmitting branches are the same as those shown in embodiment 1.

Now, the operation and function is explained on the radio base-station apparatus configured as in the above. Incidentally, because the transmitting branches in this embodiment are all to operate in quite the same way, explanation herein is representatively on the N-th transmitting branch.

At first, the transmitting signal Sct1 power-distributed by the power distribution section 207-N is inputted to the correcting branch 121-N.

Then, the transmitting signal Sct1 is processed by the correcting branch 121-N, to output frequency waveform data Sct4.

Next, the frequency waveform data Sct4-N is inputted to the frequency-response correcting value detecting section 214. On the other hand, the output signal St2-N of the weight operating section 202-N of the transmitting branch 201-N is similarly inputted to the frequency-response correcting value detecting section 214. In the frequency-response correcting value detecting section 214, detected is a frequency characteristic of amplitude and phase deviation of the frequency waveform data Sct4-N of from the correcting branch 121-N, on the basis of an output signal St2-N of the weight operating section 202-N, similarly to the example shown in embodiment 1. By using this and the already measured characteristic of the correcting branch radio circuit section 122-N, detected is a correcting value Ct-N for the transmitting-system radio circuit section 205 in the N-th transmitting branch. Thereupon, previously measured and stored is a characteristic of the correcting branch radio circuit 122-N of the correcting branch 121-N. By using the stored characteristic, previous correction is made for the amplitude and phase deviation that is to occur in the correcting branch radio circuit section. Thus, the detection value Ct-N is to detect only the amplitude and phase deviation caused in the transmitting branch. Then, the correcting value Ct-N to the N-th transmitting branch detected in the frequency-response correcting value detecting section 214 is stored in the transmit correcting value memory section 112.

By providing the transmitting branches with the above configuration, it is possible to detect, concurrently in time, correcting values to the transmitting-system radio circuit sections of the respective transmitting branches. Those are stored in the transmit correcting value memory section 112.

By the above method, stored are all the correcting values to the transmitting-system radio circuit sections 205-N of the respective transmitting branches.

Then, similarly to embodiment 1, the transmission weight correcting section 113 corrects the transmission weight Wt1 computed in the transmission weight computing section 111 by the correcting value Ct stored in the transmission correcting-value storing section 112.

Next, the transmitting signal St1 in the weight operating section 202-N is subjected to corrected weighting, and then forwarded to the antenna element 206-N.

By the above, directional transmission is possible in a desired beam pattern through each antenna.

In this manner, according to this embodiment of the invention, it is possible to carry out correction in a manner for always forming a desired beam pattern without communication shutdown, providing the same effect to the invention of embodiment 1. Efficient transmission is realized.

Incidentally, concerning as for the signal for use in detecting a correcting value to the transmitting-system radio circuit section, detection is possible if using any part of a transmitting signal provided that it is a transmitting signal sent from a radio transmitter apparatus. It is possible to use a signal such as a transmitting pilot signal sent in determined timing in time, or a transmitting data signal in communications at all times.

Incidentally, although detecting a correcting value on each transmitting branch, correcting value accuracy can be improved by conducting detections in plurality of number of times to take an average value in time into a correcting value.

Incidentally, although detecting a correcting value for each sub-carrier, correcting value accuracy can be improved by utilizing a correcting value to the adjacent sub-carrier to thereby take an average value with that.

Embodiment 3

Figure 6:
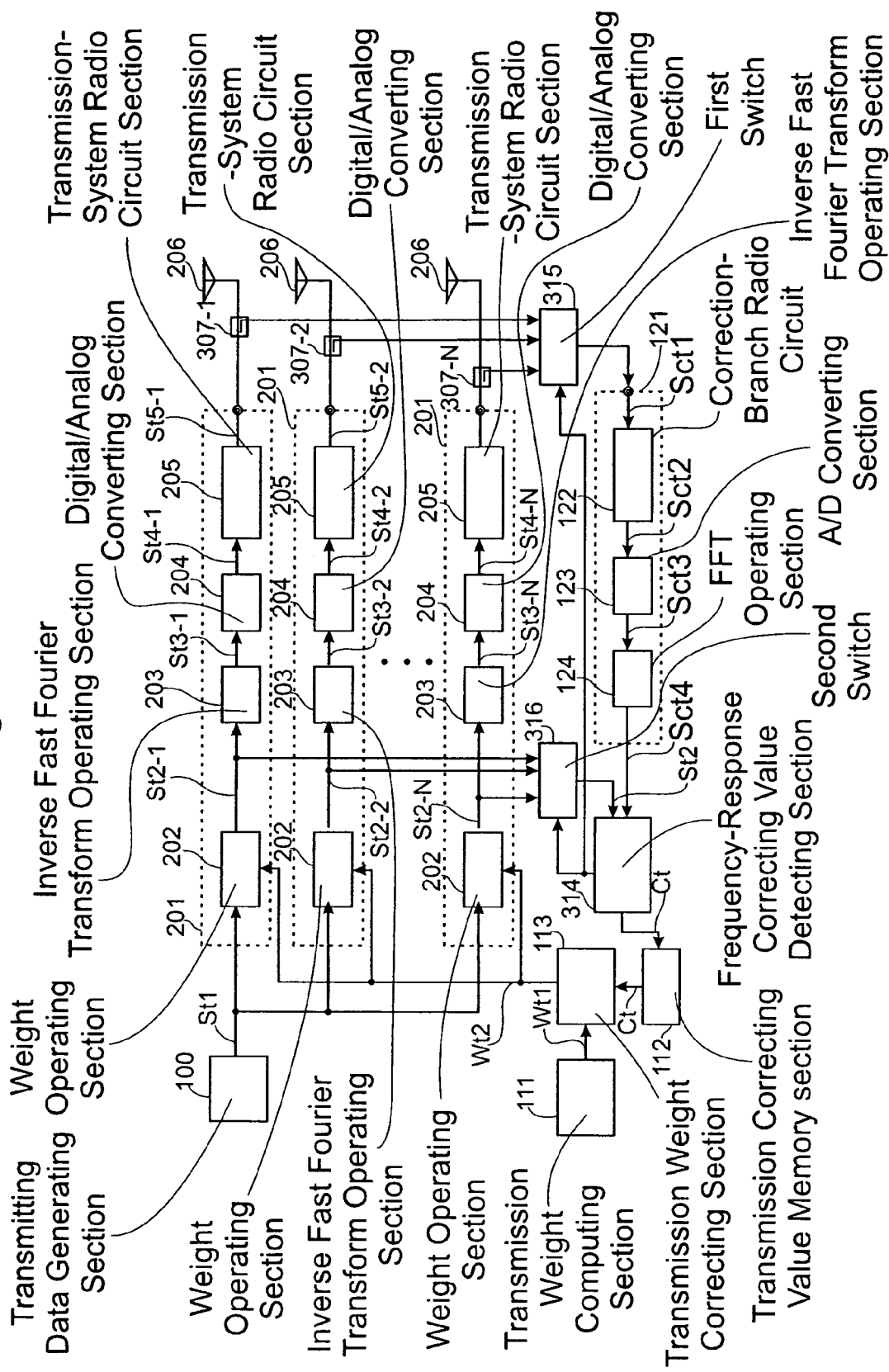
FIG. 6 is a block connection diagram of a radio base-station apparatus according to embodiment 3.

FIG. 6 is a block connection diagram of a radio base-station apparatus according to a third embodiment of the invention. In FIG. 6, a first switch 315 selects any one of outputs of power distribution section 307-1, 307-2, 307-N according to an instruction of the frequency-response correcting value detecting section 314. The first switch 315 has an output connected to a correcting branch radio circuit section 122.

A second switch 316 is to select any one of outputs of weight operating sections 202-1, 202-2, 202-N according to an instruction of the frequency-response correcting value detecting section 314. The second switch 316 has an output connected to the frequency-response correcting value detecting section 314.

The other configuration blocks are the same as those shown in embodiment 1 and embodiment 2.

The operation and function is explained below on the radio base-station apparatus configured as in the above.

At first, the transmitting signals St5-1, St5-2, St5-N from the transmitting branches 201-1, 201-2, 201-N are distributed in power by the respective power distribution section 307, thus inputted to the first switch 315.

Next, the frequency-response correcting value detecting section 314 instructs the first switch 315 and second switch 316, to select the respective outputs of the weight operating section and transmitting-system radio circuit section of the same branch. This operation is by an associative operation of the both switches 315, 316. The first switch 315 and the second switch 316 are the same in the transmitting branch number to select and the timing to select.

Next, the output signal of a transmitting branch selected by the first switch 315 is inputted to the correcting branch 121. After undergone the same process as that of embodiment 1 by the correcting branch 121, it is inputted to the frequency-response correcting value detecting section 314. On the other hand, the output signal of a weight operating section in the branch selected by the second switch 316 which is the same as the selection by the first switch 315 is inputted to the frequency-response correcting value detecting section 314.

Then, the frequency-response correcting value detecting section 314 detects a frequency characteristic of amplitude and phase deviation of the output signal of from the FFT operating section 124 based on the output signal from the second switch 316 similarly to the embodiment 2. Then, detected is the correcting value to the characteristic of the transmitting-system radio circuit section. The correcting value is stored to the transmit correcting value memory section 112.

The frequency-response correcting value detecting section 314 instructs the first switch 315 and second switch 316 to detect correcting values as above on all the transmitting branches, and stores them in the transmit correcting value memory section 112. The subsequent process is similar to that of embodiment 2.

As described above, the first switch 315 and second switch 316 associatively operate to switch over between the transmitting branches, whereby, even in case the correcting branch 121 is one in the number, it is possible to detect a correcting value to the transmitting-system radio circuit section in each transmitting branch.

As described above, according to the present embodiment of the invention, the configuration simpler than embodiment 2 can make a correction in a manner to form a desired beam pattern at all times. Efficient transmission is realized.

Incidentally, as for the transmitting branch selecting method in the first switch 315 and second switch 316, the order may be previously determined or may be adaptively selected. However, it is more preferable to preferentially start at a transmitting branch greater in amplitude or phase deviation in the transmitting-system radio circuit section, or increase the detection frequency on a transmitting branch greater in deviation than that of the other branch.

Incidentally, as for the transmitting branch selecting time by the first switch 315 and second switch 316, the same time may be selected on the transmitting branches or the selecting time may be changed from transmission branch to transmission branch.

Embodiment 4

Figure 7:
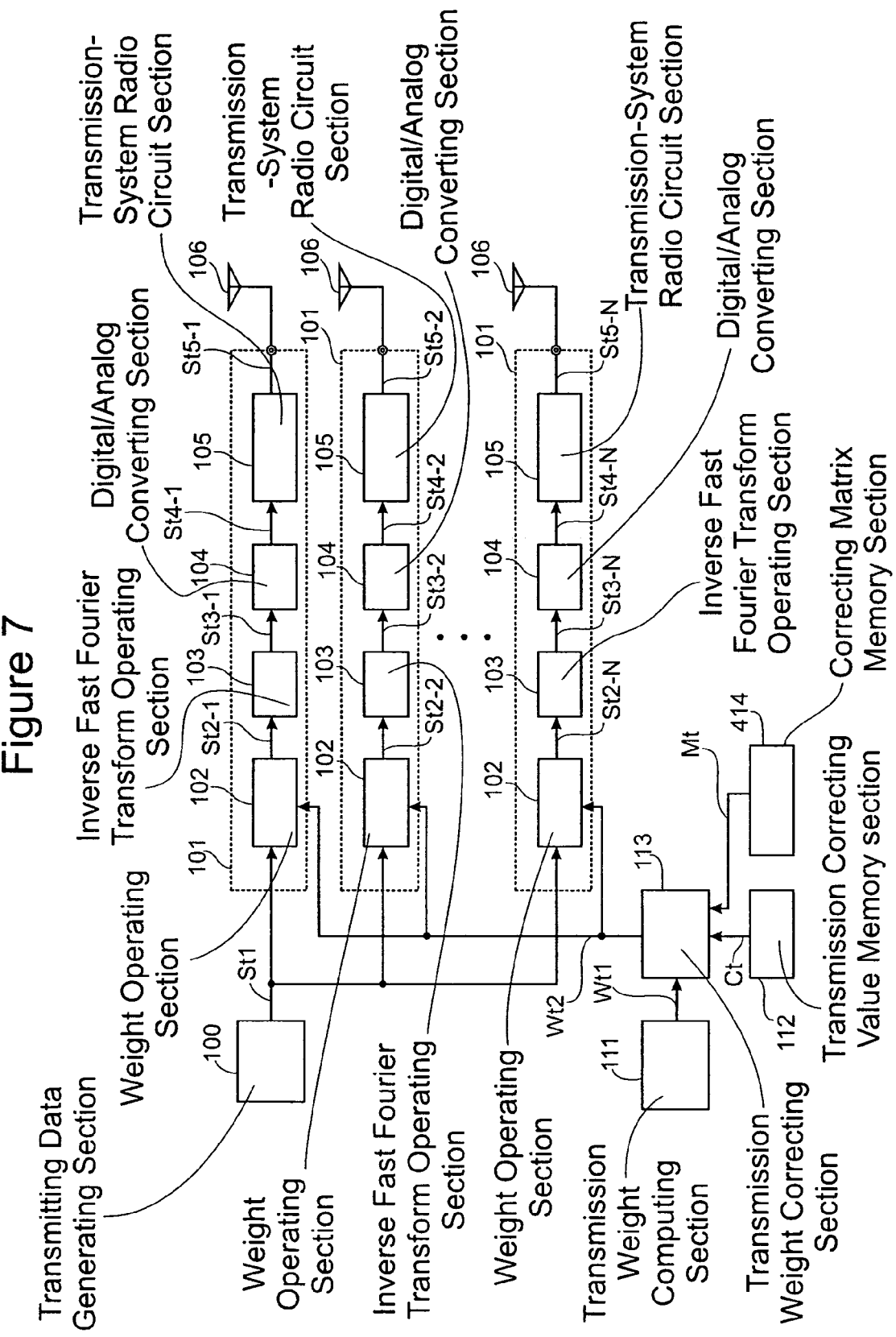
FIG. 7 is a block connection diagram of a radio base-station apparatus according to embodiment 4.

FIG. 7 is a block connection diagram of a radio base-station apparatus according to embodiment 4 of the invention. In FIG. 7, a transmission correcting matrix memory section 414 is stored with a correcting matrix Mt for correcting a coupling between antenna elements. The other configuration blocks are the same as those of embodiment 1. The correcting matrix Mt is a matrix expressing a correcting value between antenna elements.

Meanwhile, the operation of the radio base-station apparatus of this embodiment is different from that of embodiment 1 in that, in the transmission weight correcting section 113, the transmission weight W01 is corrected for a coupling between antenna elements in addition to correcting the characteristic of transmitting-system radio circuit section of each transmitting branch. Namely, the transmission weight correcting section 113 corrects the transmission weight computed in the transmission weight computing section 111 by multiplying a correcting matrix stored in the transmission correcting matrix memory section 414. Also, the transmission weight correcting section 113 corrects, at the same time, the radio circuit section of each transmitting branch by a correcting value stored in the correcting value memory section 112.

Incidentally, there are known methods to correct mutual coupling of antenna elements 106 described in the following documents. The documents are "Sensor-Array Calibration Using a Maximum-Likelihood Approach" (Boon Chong Ng, Chong Meng Samson See, IEEE Transactions on Antennas and Propagation, vol. 44, No.6, June 1996), "Calibration of a Smart Antenna for Carrying Out Vector Channel Sounding at 1.9 GHz" (Jean-Rene Larocque, John Litva, Jim Reilly, Wireless Personal Communications: Emerging Technologies for Enhanced Communications, p.259-268, 1999), and so on. These documents describe that a correcting matrix for correcting a coupling between antenna elements is computed and multiplied on a transmission weight thereby correcting the transmission weight. In the present embodiment, a correcting matrix Mt is computed by the method described in the above document and stored in the transmission correcting matrix memory section 414. Herein, as explained in embodiment 1, because the transmitting signal is an OFDM signal, transmission weight can be corrected based on each sub-carrier. For this reason, sub-carrier-based correcting matrixes are computed and stored in the transmitting correcting matrix memory section 414. Meanwhile, similarly to embodiment 1, it is possible to divide an OFDM signal band into a plurality and gather the sub-carriers existing in the band thereby computing and storing correcting matrixes, or to compute and store a correcting matrix for the OFDM signal entire band.

As described above, according to the present embodiment of the invention, the amplitude and phase deviation in the transmitting-system radio circuit section is corrected by correcting a coupling between antenna elements based on each OFDM sub-carrier, in addition to which the affection of the interference between antenna elements can be corrected based on each sub-carrier. Due to this, a desired beam pattern can be formed within an OFDM signal bandwidth. This realizes efficient transmission.

Incidentally, by further adding a correcting matrix memory section 414 to the configuration of Embodiment 2 and 3, Embodiment 2 and 3 can obtain the similar effect to that of this embodiment.

Embodiment 5

Figure 8:
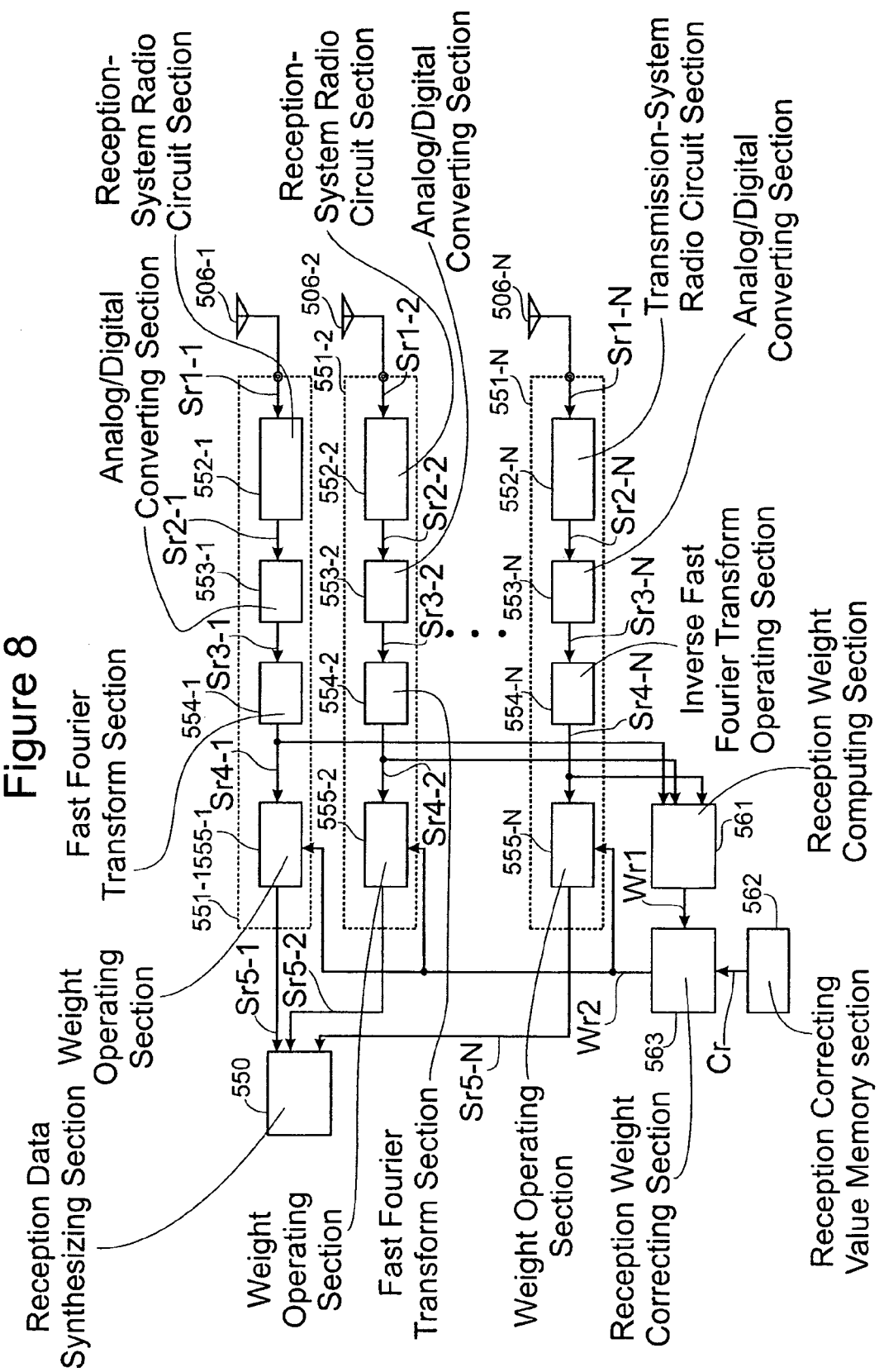
FIG. 8 is a block connection diagram of a radio base-station apparatus according to embodiment 5.

FIG. 8 is a block connection diagram of a radio base-station apparatus according to a fifth embodiment of the invention. In FIG. 8, antenna elements 506-1, 506-2, . . . 506-N are to receive an OFDM signal from a mobile station and output a signal Sr1-N. The antenna elements 506-1, 506-2, . . . 506-N are in a removable arrangement.

The receiving branch 551-1, 551-2, 551-N is configured with a receiving-system radio circuit section 552-1, 552-2, . . . 552-N, an analog/digital (A/D) converting section 553-1, 553-2, . . . 553-N, a fast Fourier transform (FFT) operating section 554-1, 554-2, . . . 554-N, and a weight operating section 555-1, 555-2, . . . 555-N. Herein, provided that the number of antenna elements is N, the receiving branches are N systems. Incidentally, the function is the same among the receiving-system radio circuit sections 552-1, 552-2, . . . 552-N, analog/digital (A/D) converting sections 553-1, 553-2, . . . 553-N, FFT operating sections 554-1, 554-2, . . . 554-N, and weight operating sections 555-1, 555-2, . . . 555-N configuring the receiving branches 551-1, 551-2, 551-N.

A reception data synthesizing section 550 is to synthesize input signals together.

A reception weight computing section 561 is to compute a reception weight Wr1 from an output signal Sr4 of the FFT operating section 554 of each receiving branch 551. Incidentally, there are known some methods to compute a reception weight, which are not especially limitative. There is, as one example, a method that a reception signal arrival direction is estimated to compute a reception weight for forming a directionality by the utilization of the estimated direction.

A reception correcting-value memory section 562 is to store the correcting values Cr for correcting an amplitude and phase deviation to occur between the receiving branches 551 on a sub-carrier-by-sub-carrier basis.

A reception weight correcting section 563 is to correct the reception weight Wr1 computed in the reception weight computing section 561 by a correcting value Cr stored in the reception correcting value memory section 562.

The operation of the radio base-station apparatus configured as above is explained in the below.

In contrast to the radio base-station apparatus of embodiment 1 as an apparatus for sending an OFDM signal, the radio base-station apparatus of this embodiment is an apparatus to receive an OFDM signal. Although there is a difference in configuration and operation due to a change of the transmitting system to a receiving system, the basic object and technique of the invention is the same. Incidentally, operation is herein explained representatively on the N-th receiving branch.

At first, the signal Sr1-N received at the antenna element 506-N is power-amplified by the reception-system radio circuit section, and processed such as by frequency conversion of from a radio frequency to a base-band frequency or intermediate frequency. Besides this, filter process or the like is carried out for the purpose of noise or unwanted signal removal.

Herein, similarly to the transmission-system radio circuit section 105 of embodiment 1, amplitude or phase deviation is caused between the reception branches by a characteristic difference of the analog elements in the reception-system radio circuit sections 552.

Then, the signal Sr2-N reception-signal-processed in such radio frequency band is converted by the A/D converter 553-N into a digital signal.

Next, the digital-converted signal Sr3-N, in the FFT operating section 554-N, is Fourier-transformed. Herein, although there is a discrete Fourier transformation or the like as a method of Fourier-transform computation, fast Fourier transform (FFT) is desirable in respect of computation time and operation processing amount.

Then, the Fourier-transformed signal Sr4-N, in the weight operating section 555-N, is weighted by a reception weight Wr2 outputted from the reception weight correcting section 563. The operation of the weight operating section 555-N is the same as the operation of the weight operating section 102, in the embodiment 1 and weighting is made based on each sub-carrier of OFDM signal. Due to this, outputted is a signal Sr5-N weighted by the reception weight. Incidentally, the method of computing a reception weight Wr2 is referred later.

The obtained output signals Sr5-1, Sr5-2, Sr5-N from the receiving branches are inputted to the reception data synthesizing section 550 and synthesized in the reception data synthesizing section 550, thereby obtaining received data.

Meanwhile, the foregoing reception weight Wr2 can be determined, in the reception-weight computing section 561, by correcting a reception weight Wr1 computed for each sub-carrier from an output signal Sr4 of the FFT operating section of each receiving branch 551 by a sub-carrier-based correcting value Cr previously stored in the reception correcting-value memory section 562. Incidentally, because the received signal is an OFDM signal, computing a reception weight Wr1 can be made for each carrier. Meanwhile, it is possible to divide the OFDM signal band into a plurality of bands and take the sub-carriers existing within the band as one group, thereby setting a same reception weight. This is the same as the explanation of upon setting a transmission weight Wt in embodiment 1.

Also, similarly to reception-weight computation, signal band can be divided into a plurality of bands, to store correcting values Cr in the number of the divisional bands. Otherwise, sole one correcting value Cr can be stored for the entire signal band.

Herein, explained in the below is a method for determining a correcting value Cr.

Figure 9:
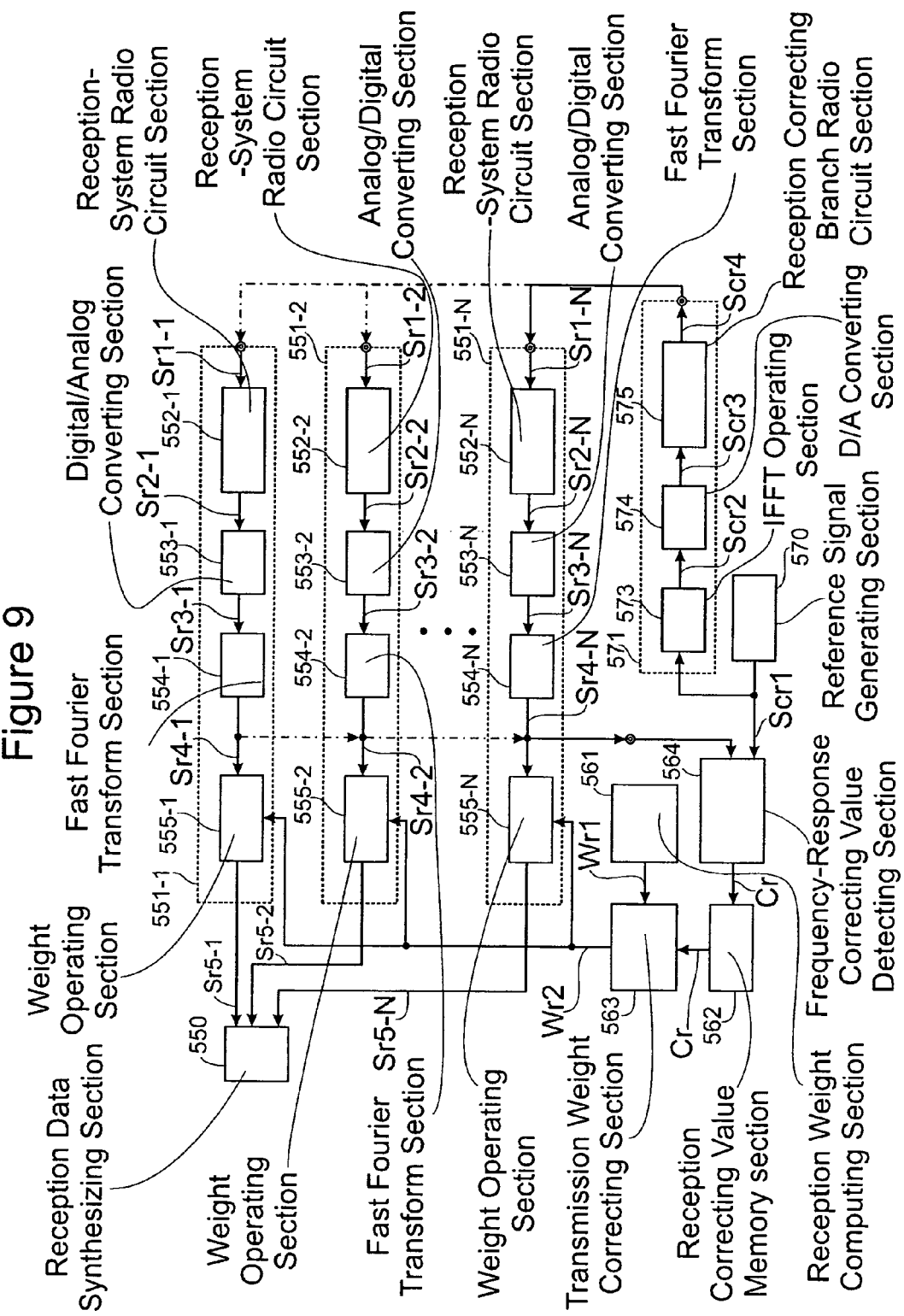
FIG. 9 is a block connection diagram exemplifying a correcting-value detecting method in embodiment 5.

The correcting value Cr is to detect a frequency characteristic of amplitude/phase deviation in the receiving radio circuit section 552 and to correct the characteristic. Consequently, it is satisfactory provided that to detect a frequency characteristic of amplitude/phase deviation in the receiving radio circuit section 552, one example of which is shown in FIG. 9. FIG. 9 is the radio base-station apparatus of this embodiment with removal antenna elements removed and with a correcting branch for computing a correcting value connected.

In FIG. 9, a correcting branch 571 is configured with an IFFT operating section 573, a D/A converting section 574 and a reception correcting branch radio circuit section 575. The correcting branch 571 is the same as the correcting branch 121 of embodiment 1 shown in FIG. 4.

A reference signal generating section 570 is to generate a reference signal Scr1 for computing a correcting value.

A frequency-response correcting value detecting section 564 is to detect an amplitude and phase deviation of a signal Sr4 of from the receiving branch 551 on each sub-carrier and compute a correcting value for each sub-carrier, on the basis of a signal Scr1 from the reference signal generating section 570. The other configuration blocks are the same as those described in FIG. 8, having the same function.

Explained is the operation of the radio base-station apparatus for computing a correcting value configured as above.

At first, the reference signal Scr1 from the reference signal generating section 570 is transmission-processed in the correcting branch 571. This transmission process corresponds to the process of the transmitting branch in embodiment 1.

Then, a transmission-processed signal Scr4 is reception-processed by the receiving branch at 551, to input an output signal Scr4 of the FFT operating section 554 to the frequency-response correcting value detecting section 564.

On the other hand, the signal Scr1 from the reference signal generating section 570 is inputted to the frequency-response correcting value detecting section 564.

Then, in the frequency-response correcting value detecting section 564, sub-carrier-based correcting values are computed and stored in the reception correcting value memory section 562.

By carrying out the above detection on all the receiving branches, the correcting values Cr for all the branches and sub-carriers can be stored in the receiving correcting value memory section.

As described above, according to the present embodiment of the invention, by previously determining and storing an amplitude and phase deviation to occur between the receiving branches or a correcting value for correcting a frequency characteristic on a sub-carrier-by-sub-carrier basis, in the case to directionally send a broadband OFDM signal, it is possible to correct an amplitude and phase deviation to occur between receiving branches and a frequency characteristic on a sub-carrier-by-sub-carrier basis. Due to this, a desired beam pattern can be formed within an OFDM bandwidth, enabling reception with high transmission efficiency.

Incidentally, by further adding a reception correction matrix memory section corresponding to the transmission correcting matrix memory section 414 storing a correcting matrix for correcting a coupling between antenna elements shown in FIG. 7 in embodiment 4, correction is possible in the reception weight correcting section 563. Due to this, correction is possible for a coupling between antenna elements in addition to correction for an amplitude and phase deviation between receiving branches, enabling reception higher in transmission efficiency.

Embodiment 6

Figure 10:
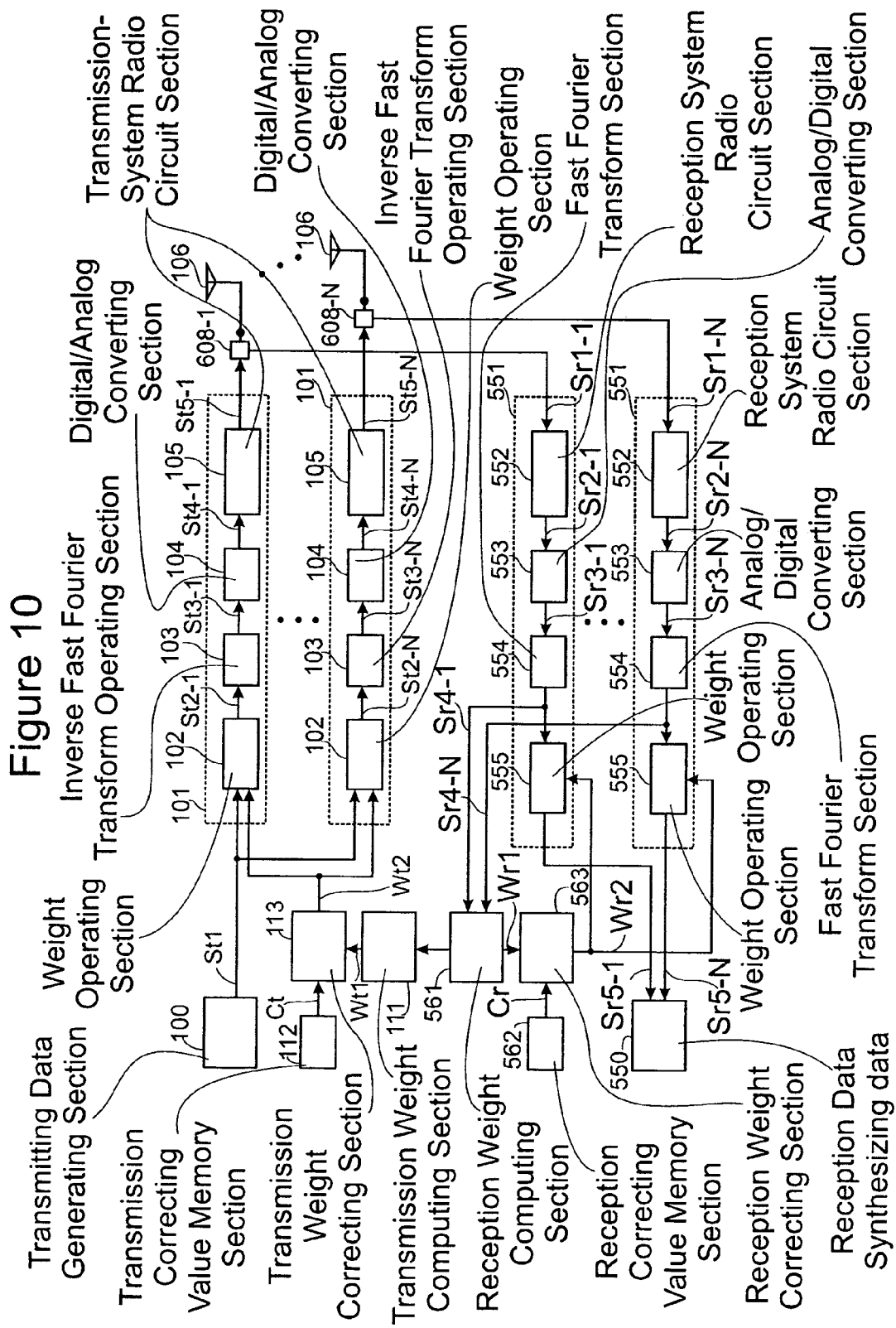
FIG. 10 is a block connection diagram of a radio base-station apparatus according to embodiment 6.

FIG. 10 is a block connection diagram of a radio base-station apparatus according to a sixth embodiment of the invention. The radio base-station apparatus of this embodiment is in a configuration combining together the radio base-station apparatus having a transmission function of embodiment 1 shown in FIG. 1 and the radio base-station apparatus having a reception function of embodiment 5 shown in FIG. 8. In FIG. 10, switch section 608-1, . . . 608-N is to switch over between a signal path of from a transmitting branch 101-1, 101-N to an antenna element 106-1, . . . 106-N and a signal path of from the antenna element 106-1, . . . 106-N to the transmitting branch 101-1, 101-N.

The transmission data generating section 100, the transmitting branch 101-1, 101-N, the antenna element 101-1, . . . 106-N, the transmission weight computing section 111, the transmission correcting value memory section 112 and the transmission weight correcting section 113 are the same as those of embodiment 1. The transmitting operation by them is also the same.

Meanwhile, the reception data synthesizing section 550, the receiving branches 551-1, 551-N, the reception weight computing section 561, the reception correcting value memory section 562 and the reception weight correcting section 563 are the same as those of embodiment 5. The receiving operation by those is also the same. Herein, provided that the number of antenna elements is N, the transmitting branches and the receiving branches are N systems in the number.

The radio base-station apparatus configured as above is explained in the below.

The present embodiment has switch section provided at 608 close to each antenna element 106, to switch over between a transmission signal of from the transmitting branch to the antenna element and a reception signal of from the antenna element to the receiving branch and convey each of the signals, thereby combining the operations of embodiment 1 and embodiment 5.

Namely, the signal from the transmitting branch 101, only when selected to the transmitting side by each switch section 608, is conveyed only to the antenna element 106 without being conveyed to the receiving branch 551. Meanwhile, the signal from the antenna element 106, only when selected to the receiving side by each switch section 608, is conveyed only to the receiving branch 551 without being conveyed to the transmitting branch at 101.

Meanwhile, in the reception weight computing section 561, a reception weight Wr1 is computed by using a signal Sr4 that the received signal is processed, similarly to embodiment 5. However, in the transmission weight computing section 111, a transmission weight Wt1 is computed by using a reception weight Wr1 computed in the reception weight computing section 561, differently from embodiment 1. For example, in the time division duplex (TDD) scheme, the reception weight Wr1 is rendered as a transmission weight Wt1 as it is while, in the frequency division duplex (FDD) scheme, receiving direction information can be estimated from a reception weight Wr1 and utilized in computing a transmission weight Wt1.

As in the above, according to the present embodiment of invention, where directionally sending and receiving a broadband OFDM signal, by correcting a frequency characteristic of amplitude and phase deviation to occur between the transmitting branches and the receiving branches on a sub-carrier-by-sub-carrier basis, a desired beam pattern can be formed in an OFDM-signal bandwidth. This enables transmission and reception with high transmission efficiency.

Incidentally, similarly to the present embodiment, it is possible to combine the radio base-station apparatuses of embodiments 2 and 5, combine the radio base-station apparatuses of embodiments 3 and 5, or combine the radio base-station apparatuses of embodiments 4 and 5. In this case, a radio base-station apparatus can be realized which has the functions described in the respective embodiments.

INDUSTRIAL APPLICABILITY

As in the above, the present invention is useful for a transmitter apparatus using an array antenna for directionally sending an OFDM signal, which is suited for obtaining a desired beam pattern even where a frequency characteristic occurs in an amplitude/phase deviation between the branches.

The invention claimed is:
1. A radio base-station apparatus comprising:
 a transmission weight computing section for computing transmission weights for directional transmission using an OFDM signal, the OFDM signal comprising a plurality of sub-carriers;

a transmission correcting value memory section for storing one correcting value for correcting the transmission weight for each of the plurality of sub-carriers;

a transmitting weight correcting section for correcting the transmission weight for each of the plurality of sub-carriers with the correcting value; and a plurality of transmitting branches, each of the transmitting branches for weighting transmission data with the corrected transmission weight outputted from the transmission weight correcting section on a sub-carrier-by-sub-carrier basis and for providing the weighted transmission data to an antenna element, the correcting value is used to correct a frequency characteristic of amplitude deviations and phase deviations between transmitting branches, and wherein the correcting value is determined separately for each individual transmitting branch based on respective amplitude deviation and respective phase deviation of the transmission data within each individual transmitting branch.

2. A radio base-station apparatus according to claim 1, comprising a plurality of the transmitting branches and
an array antenna structured by a plurality of the antenna elements.

3. A radio base-station apparatus according to claim 2, wherein the transmitting branch comprises
a weight operating section for weighting the transmission data with the transmission weight outputted from the transmission weight correcting section,
an inverse fast Fourier transform operating section for carrying out inverse Fourier transformation on an output signal of the weight operating section,
a D/A converting section for converting an output signal of the inverse fast Fourier operating section into an analog signal, and
a transmitting-system radio circuit section for frequency-converting an output signal of the D/A converting section into a radio frequency.

4. A radio base-station apparatus according to claim 2, wherein the transmission weight correcting section corrects, based on each sub-carrier or based on each band including the plurality of sub-carriers, an OFDM-signal-sub-carrier based transmission weight computed in the transmission weight computing section, by using the correcting value stored in the transmission correcting value memory section.

5. A radio base-station apparatus according to claim 2, wherein the correcting value stored by the transmission correcting value memory section is to correct an amplitude deviation and phase deviation to occur between the transmission branches.

6. A radio base-station apparatus according to claim 3, wherein the weight operating section weights transmission data on a sub-carrier-by-sub-carrier basis, with a transmission weight of each sub-carrier corrected by the transmission weight correcting section.

7. A radio base-station apparatus according to claim 3, further comprising a correcting branch radio circuit section for inputting a signal outputted from the transmitting branch and carrying out at least frequency conversion,
an A/D converting section for converting an output signal of the correcting branch radio circuit section into a digital signal,
a fast Fourier transform operating section for Fourier-transforming an output digital signal of the A/D converting section,
a frequency-response correcting value detecting section for taking as a reference an output signal of the weight operating section, to detect an amplitude deviation and phase deviation of a signal from the fast Fourier operating section and detect a correcting value for correcting an amplitude deviation and phase deviation between the transmitting branches, the antenna element being removable.

8. A radio base-station apparatus according to claim 7, wherein the transmission correcting value memory section is stored with the correcting value computed by the frequency-response correcting value detecting section when the correcting branch radio circuit section is connected, one to one, with the transmitting branch in a state that the antenna element is not connected.

9. A radio base-station apparatus according to claim 3, further comprising a power distributing section arranged close to the antenna element,
a correcting branch radio circuit section for inputting a signal distributed in the power distributing section and carrying out at least frequency conversion,
an A/D converting section for converting an output signal of the plurality of correcting branch radio circuit sections into a digital signal,
a fast Fourier transform operating section for Fourier-transforming an output digital signal of the A/D converter section, and
a frequency-response correction detecting section for taking as a reference an output signal of the weight operating section, to detect an amplitude deviation and phase deviation of a signal from the fast Fourier transform operating section and detect a correcting value for correcting an amplitude deviation and phase deviation between the transmitting branches,
the transmission correcting value memory section being stored with the correcting value detected by the frequency-response correction detecting section.

10. A radio base-station apparatus according to claim 7, wherein the frequency-response correction detecting section detects an amplitude and phase of an output signal of the fast Fourier transform operating section for each sub-carrier of the OFDM signal, and detects a correcting value for correcting an amplitude deviation and phase deviation between transmitting branches on a sub-carrier-by-sub-carrier basis by using a detection result of the amplitude and phase.

11. A radio base-station apparatus according to claim 9, wherein the frequency-response correction detecting section detects an amplitude and phase of an output signal of the fast Fourier transform operating section based on each sub-carrier of the OFDM signal, and detects a correcting value for correcting an amplitude deviation and phase deviation between transmitting branches on a sub-carrier-by-sub-carrier basis by using a detection result of the amplitude and phase.

12. A radio base-station apparatus according to claim 9, further comprising a first switch for selecting one from signals distributed by a plurality of power distributing section and connecting it with the correcting branch radio circuit section,
a second switch for selecting a signal from a plurality of weight operating sections and connecting it with the frequency-response correcting value detecting section,
the first switch and the second switch selecting the signal from the same transmitting branch.

13. A radio base-station apparatus according to claim 10, further comprising a first switch for selecting one from signals distributed by a plurality of power distributing section and connecting it with the correcting branch radio circuit section, a second switch for selecting a signal from a plurality of weight operating sections and connecting it with the frequency-response correcting value detecting section, the first switch and the second switch selecting the signal from the same transmitting branch.

14. A radio base-station apparatus according to claim 2, further comprising a transmission correcting matrix memory section for previously storing a correcting matrix for correcting a coupling between the antenna elements, the transmission weight correcting section further correcting the transmission weight by the correcting matrix.

15. A radio base-station apparatus according to claim 14, wherein the transmission correcting matrix memory section is stored with correcting matrixes based on each sub-carrier of the OFDM signal.

16. A radio base-station apparatus according to claim 14, wherein the transmission correcting matrix memory section is stored with correcting matrixes based on a plurality of sub-carriers existing in plurally divided signal bands of the OFDM signal.

17. A radio base-station apparatus comprising:
a plurality of receiving branches configured to receive an OFDM signal from an array antenna and provide a respective plurality of demodulated signals;
a reception weight computing section for computing a reception weight by using the plurality of demodulated signals;
a reception correcting value memory section for storing one correcting value for correcting the reception weight for each sub-carrier of the OFDM signal or for each band including a plurality of the sub-carriers;
a reception weight correcting section for correcting the reception weight by the correcting value, the correcting value is used to correct a frequency characteristic of amplitude deviations and phase deviations between receiving branches; and
a weight operating section for weighting the respective demodulated signal with the corrected reception weight,
wherein the correcting value is determined separately for each individual receiving branch based on respective amplitude deviation and respective phase deviation within each individual receiving branch.

18. A radio base-station apparatus according to claim 17, wherein the reception weight correcting section corrects, based on each sub-carrier or based on each band including the plurality of sub-carriers, an OFDM-signal-sub-carrier based reception weight computed in the reception weight computing section, by using the correcting value stored in the reception correcting value memory section.

19. A radio base-station apparatus according to claim 17, wherein the reception weight computing section divides an OFDM signal bandwidth into a plurality and computes one reception weight for a plurality of sub-carriers existing in a divisional band, the reception weight correcting section correcting, based on each sub-carrier or based on each band including the plurality of sub-carriers, the reception weight computed in the reception weight computing section by using the correcting value stored in the reception correcting value memory section.

20. A radio base-station apparatus according to claim 17, wherein the correcting value stored in the reception correcting value memory section is to correct an amplitude deviation and phase deviation to occur between the receiving branches.

21. A radio base-station apparatus according to claim 17, wherein the weight operating section weights the demodulated signal, based on each sub-carrier, by a reception weight of each sub-carrier corrected by the reception weight correcting section.

22. A radio base-station apparatus according to claim 17 further comprising:
a reference signal generating section for generating a signal as a reference to detect an amplitude deviation and phase deviation between the receiving branches;
an inverse fast Fourier transform operating section for inverse Fourier-transforming a signal from the reference signal generating section;
a D/A converting section for converting an output signal of the inverse fast Fourier operating section into an analog signal;
a correcting branch radio circuit section for frequency-converting the output analog signal of the D/A converting section into a radio frequency; and
a frequency-response correcting value detecting section for taking as a reference an output signal of the reference signal generating section, to detect an amplitude deviation and phase deviation of an output signal from the inverse fast Fourier operating section and detect a correcting value for correcting an amplitude deviation and phase deviation between the receiving branches, the array antenna being removable.

23. A radio base-station apparatus according to claim 22, wherein the reception correcting value memory section stores the correcting value computed by the frequency-response correcting value detecting section when the correcting branch radio circuit section is connected, one to one, with the receiving branch in a state that the antenna element is not connected.

24. A radio base-station apparatus comprising:
a receiving circuit section having:
a plurality of receiving branches configured to receive an OFDM signal from an array antenna and provide a respective plurality of demodulated signals, the OFDM signal comprising a plurality of sub-carriers;
a receiving weight computing section for computing a reception weight by using the plurality of demodulated signals,
a reception correcting value memory section storing a reception correction value for correcting the reception weight for each of the plurality of sub-carriers,
a reception weight correcting section for correcting the reception weight by the reception correction value, the correcting value is used to correct a frequency characteristic of amplitude deviations and phase deviations between receiving branches and
a reception weight operating section for weighting the respective demodulated signal by the corrected reception weight,
wherein the reception correction value is determined for each receiving branch based on an amplitude deviation and a phase deviation within the corresponding receiving branch;
a transmitting circuit section having:
a transmission weight computing section for computing transmission weights for directional transmission by using information about a directivity in the reception weight computing section,
a transmission correcting value memory section storing a transmission correction value for correcting the transmission weight based on each of the plurality of sub-carriers,
a transmission weight correcting section for correcting the transmission weight for each of the plurality of sub-carriers by the transmission correction value, and a plurality of transmitting branches, each of the transmitting branches for weighting transmission data the corrected transmission weight outputted from the transmission weight correcting section on a sub-carrier-by-sub-carrier basis and for providing the weighted transmission data to a respective antenna element of the array antenna, the correcting value is used to correct a frequency characteristic of amplitude deviations and phase deviations between transmitting branches, wherein the transmission correction value is determined separately for each individual transmitting branch based on respective amplitude deviation and respective phase deviation of the transmission data within each individual transmitting branch; and a switch section for switching over a connection between the respective antenna element and the receiving circuit section or a connection between the respective antenna element and the transmitting circuit section.

* * * * *